April 13, 1954 E. VROOM 2,675,426

ELECTRONIC INDUCTION NUMBER GROUP TRANSLATOR

Filed May 17, 1950 15 Sheets-Sheet 1

INVENTOR.
EDWARD VROOM
BY William F. Simpson
ATTORNEY

April 13, 1954 E. VROOM 2,675,426

ELECTRONIC INDUCTION NUMBER GROUP TRANSLATOR

Filed May 17, 1950 15 Sheets-Sheet 2

INVENTOR.
EDWARD VROOM

BY William F. Simpson

ATTORNEY.

April 13, 1954 E. VROOM 2,675,426

ELECTRONIC INDUCTION NUMBER GROUP TRANSLATOR

Filed May 17, 1950 15 Sheets-Sheet 3

INVENTOR.
EDWARD VROOM
BY William F. Simpson
ATTORNEY.

ELECTRONIC INDUCTION NUMBER GROUP TRANSLATOR

Filed May 17, 1950 15 Sheets-Sheet 4

INVENTOR.
EDWARD VROOM
BY William F. Simpson.
ATTORNEY.

April 13, 1954 E. VROOM 2,675,426

ELECTRONIC INDUCTION NUMBER GROUP TRANSLATOR

Filed May 17, 1950 15 Sheets-Sheet 5

INVENTOR.
EDWARD VROOM
BY William F. Simpson.
ATTORNEY.

ELECTRONIC INDUCTION NUMBER GROUP TRANSLATOR

Filed May 17, 1950 15 Sheets-Sheet 6

INVENTOR.
EDWARD VROOM
BY *William F. Simpson*
ATTORNEY

INVENTOR.
EDWARD VROOM
BY *William F. Simpson.*
ATTORNEY.

INVENTOR.
EDWARD VROOM
BY William F. Simpson.
ATTORNEY.

April 13, 1954 E. VROOM 2,675,426

ELECTRONIC INDUCTION NUMBER GROUP TRANSLATOR

Filed May 17, 1950 15 Sheets-Sheet 9

INVENTOR.
EDWARD VROOM
BY William F. Simpson
ATTORNEY.

TERMINAL STRIP A

INVENTOR.
EDWARD VROOM
BY William F. Simpson.
ATTORNEY.

#5 CROSS BAR SYSTEM FOR SETTING UP CONNECTIONS FOR AN INTRA-OFFICE CALL

INVENTOR.
EDWARD VROOM
BY William F. Simpson
ATTORNEY.

ELECTRONIC INDUCTION NUMBER GROUP TRANSLATOR

INVENTOR.
EDWARD VROOM

BY William F. Simpson

ATTORNEY

April 13, 1954 E. VROOM 2,675,426

ELECTRONIC INDUCTION NUMBER GROUP TRANSLATOR

Filed May 17, 1950 15 Sheets-Sheet 13

SHOWING SEQUENCE OF OPERATIONS IN COMPLETING A CALL TO A NON-PBX LINE.

INVENTOR.
EDWARD VROOM
BY William F. Simpson
ATTORNEY.

INVENTOR.
EDWARD VROOM
BY *William F. Simpson*
ATTORNEY.

SHOWING SEQUENCE OF OPERATIONS IN SEEKING AN IDLE TRUNK IN A GROUP OF TRUNKS ON SEPARATE TENS BLOCKS

INVENTOR.
EDWARD VROOM
BY William F. Simpson,
ATTORNEY.

Patented Apr. 13, 1954 2,675,426

UNITED STATES PATENT OFFICE 2,675,426

ELECTRONIC INDUCTION NUMBER GROUP TRANSLATOR

Edward Vroom, Ossining, N. Y., assignor to Bell Telephone Laboratories, Incorporated, New York, N. Y., a corporation of New York Application May 17, 1950, Serial No. 162,497

22 Claims. (Cl. 179—18)

This invention relates to automatic telephone switching systems of the type often referred to as common control systems, and, particularly, to means in such systems by which the telephone directory number of a called subscriber may, in effect, be translated into terms that will enable the marker circuit of such system to determine the location of the hold magnet of the called line in that system so that the connection of the calling line to the called line may be readily effected.

In a common control telephone switching system, particularly of the cross-bar type, each subscriber's line has associated with itself a line relay and the hold magnet of a cross-bar switch, which equipment is located on frames in the central office. The line equipment is usually considered as including a line hold magnet. The location of a particular hold magnet may be defined by specifying the number of the line-link frame and the numbers of the vertical group and the horizontal group of switches and also the vertical file of hold magnets upon the frame in which the particular hold magnet appears.

In numerous telephone switching systems in the prior art, the directory number of the called subscriber's line is also employed to designate the location of the line terminals and such other equipment as may be desired upon the switching frames and switches thereof. While such an arrangement is satisfactory under certain circumstances, it has proved to be inflexible in other cases so that the switching equipment is not uniformly loaded with the result that certain switches are overloaded while others are practically idle. In telephone switching systems of the cross-bar type provision has been made so that the directory number does not designate the location of the subscriber's line or the related equipment such as the hold magnets. Instead, a translating circuit, frequently called a "number group circuit" is provided for translating the directory number into other numbers or designations of the location of the subscriber's line upon the switching frames so that this line equipment and terminals may be located and then connections established to it.

This invention resides in an improvement in the number group circuit of a cross-bar telephone system which translates the telephone directory number of a called subscriber's line to an indication of the position of the hold magnet of that line upon the line-link frames of such system. The translation is effected by automatically selecting one of a group of translator circuits each of which employs a jumper or cross-connecting wire which is inductively linked with a selected combination of coils and by sending a surge of current through the selected circuit to induce a voltage in each coil of the selected combination. The voltage thus induced will indirectly operate relays in the marker and thereby identify the location of the terminals of the wanted line in terms of the particular line-link frame, and the particular cross-bar switch upon that frame and the particular vertical file upon which the wanted line terminates. In the copending application of Dimond, Serial No. 160,497, filed May 6, 1950, now Patent No. 2,614,176, there is disclosed a translating system employing a "ring" type of translator in which the selection of the translator circuit corresponding to the wanted subscriber's line is effected by the use of relay "tree" circuits.

The present invention differs therefrom in that the selection of the translator circuit is effected by the use of a cross-bar switch in which a select magnet corresponding to the hundreds digit of the directory number of the wanted line, and the hold magnet corresponding to the tens digit, and a units relay corresponding to the units digit of that number, will be operated by the setting up of the directory number of the wanted line in the originating register of the cross-bar system.

The present invention differs from the above-identified copending application of Dimond in another respect. In the above-identified copending application of Dimond the translator is provided with a coil and associated detecting equipment including tubes, relays, etc., for each digital value of each of the denominational orders of the translated number. In accordance with the present invention, the number of coils required is reduced by threading the selected wire through a code group of two coils or more of each group instead of through only one coil in each group. In other words, the wire is threaded through a code group of the coils for each of a plurality of coils for each denominational order of the translated number. In order to improve the reliability of the operation of the translator the so-called two-out-of-five code is employed for representing each of these digits of the various denominational orders, thus permitting the operation of the circuit to be checked in a well-understood manner by insuring that two and only two coils have voltages induced in them and thus two and only two of the associated relays are operated for each denominational order of each translation. When the called line is a non-P. B. X line, the operation of those magnets and the units relay will close the particular translator circuit corresponding to the directory number of the wanted line, and that, in turn, will cause a surge of current to be sent over the translator circuit which will induce a voltage in the coils of the number group circuit and thereby will operate relays by which the location of the hold magnet of the wanted line upon the line-link frames will be made known to the marker. When the called line is one of a group of P. B. X trunks a cross-bar switch will select a circuit which will hunt for an idle trunk in the group and, upon finding it, will send a surge of current over a translator circuit by which the location of the hold magnet of that trunk is determined.

In the circuit in which this invention is embodied, a plurality of cross-bar switches are employed in selecting the translator circuit, certain of which are used to effect the translation of a directory number of a non-P. B. X line to an indication of the position of the hold magnet of the wanted line upon a line-link frame, and other cross-bar switches are employed when the wanted line is one of a group of P. B. X trunks.

The copending application of Cahill-Carpenter-Dimond Serial No. 57,388, filed October 29, 1948, now Patent No. 2,599,358, discloses means utilizing an inductive translator for translating the indication of the position of the hold magnet of a calling line into the digits of the directory number of that line and for recording said directory number. The present invention, while also employing an inductive translating device differs from that disclosed in the said application of Cahill-Carpenter-Dimond in that it is concerned with the determination of the location upon a line-link frame of the hold magnet of a called line and it effects such determination by translating the directory number of that line into terms that indicate the particular frame and the particular vertical group and horizontal group of cross-bar switches and also the particular vertical file of hold magnets in which the hold magnet of the called line appears, thereby enabling the marker circuit to set the switches to establish the connection between the calling line and the called line.

This invention will be clearly understood from the following description when read in connection with the attached drawing of which—

Fig. 1 shows a circuit of the marker connector relay, the marker preference relays, and the dial code register relays in the marker circuit employed in the cross-bar system in which the present invention is embodied;

Fig. 2 shows, in circuit form, a cross-bar switch employed in the present invention in connection with the translation of the directory number of a wanted non-P. B. X line into an indication of the position of the hold magnet of that line upon a line-link frame of the cross-bar system;

Figure 9:
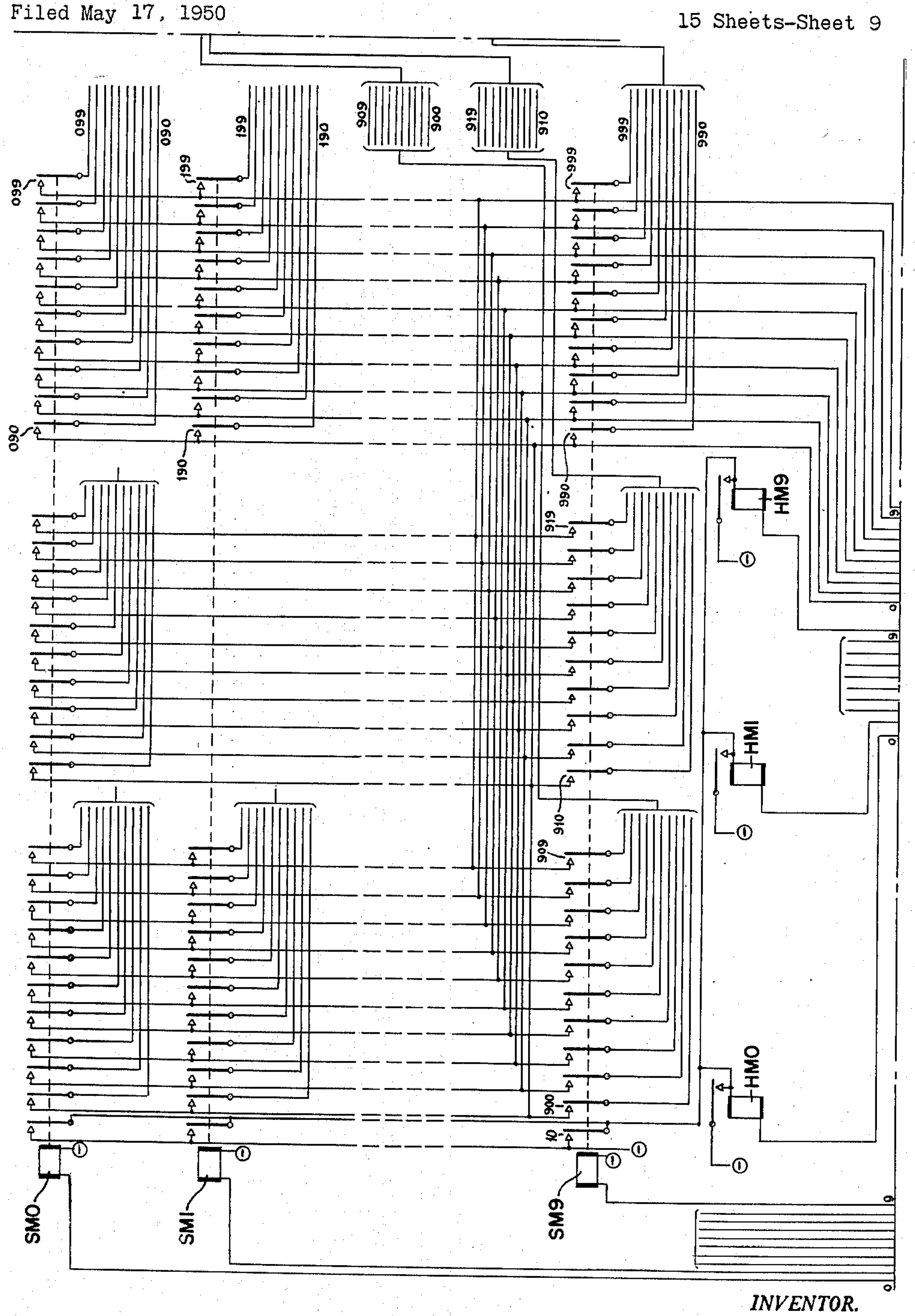
Figure 10:
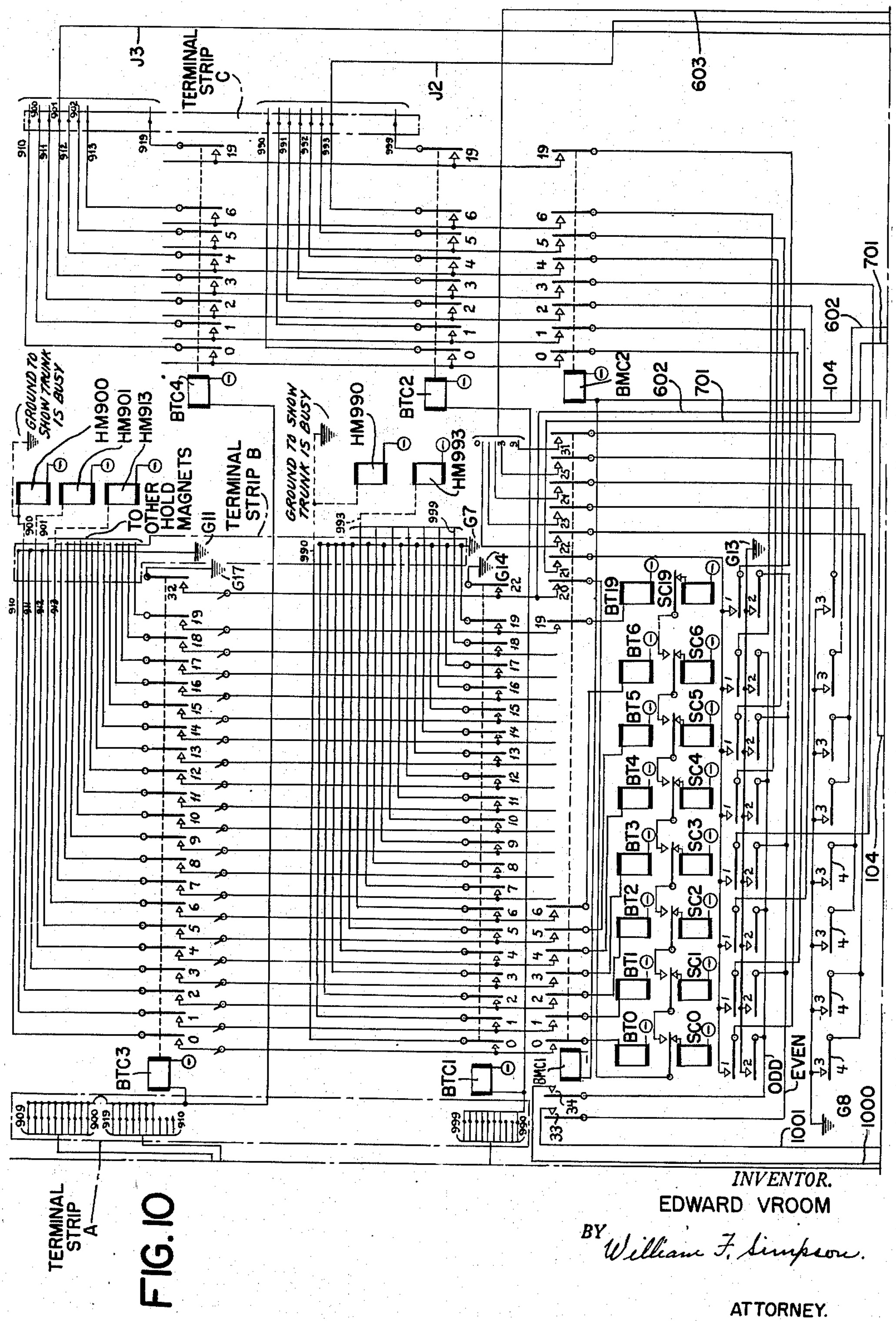
Figure 11:
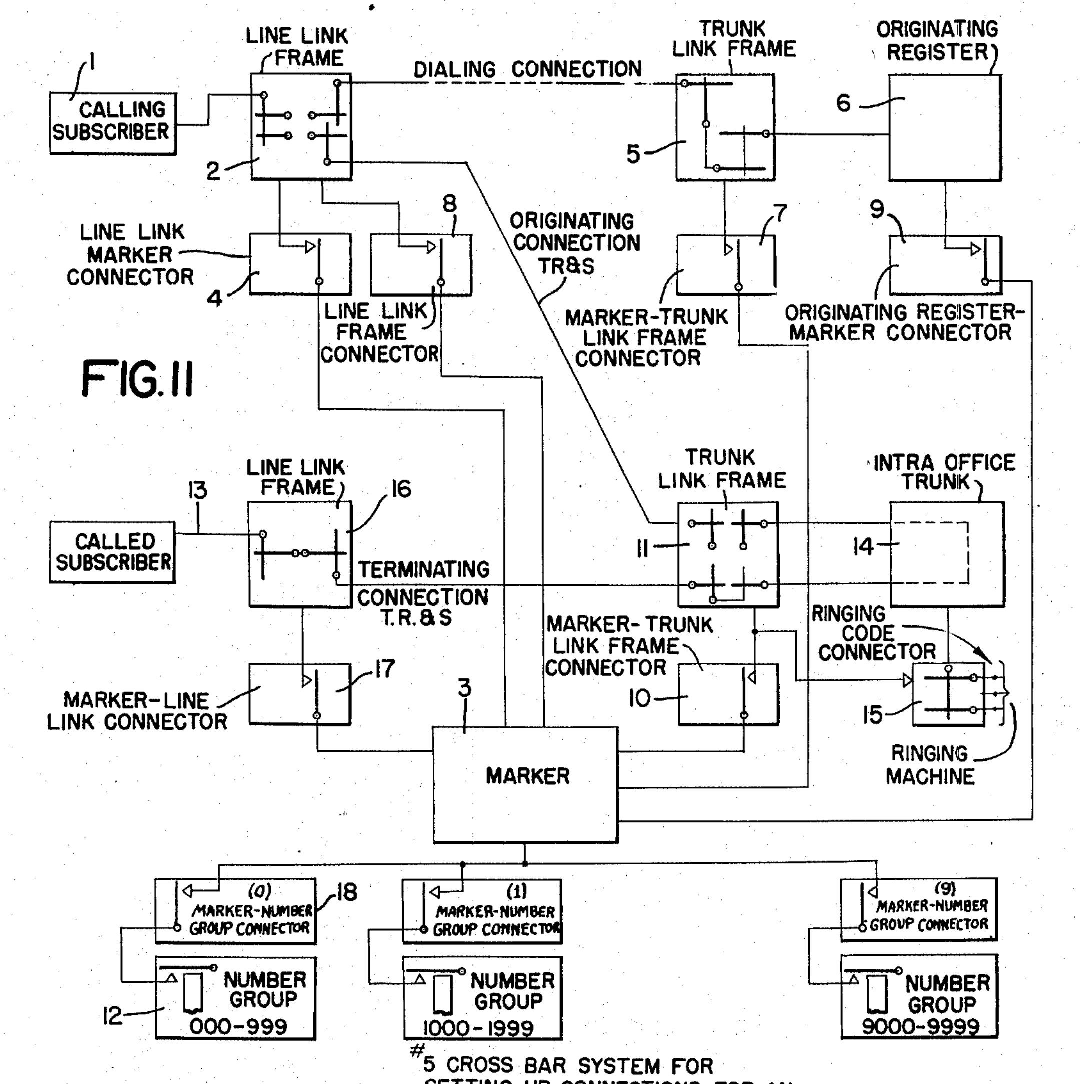
Figure 13:
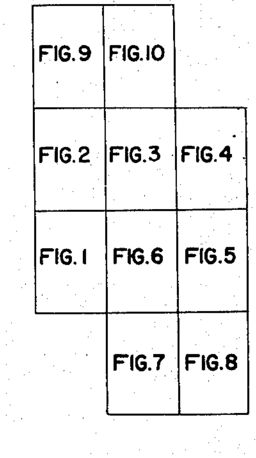
Figure 12:
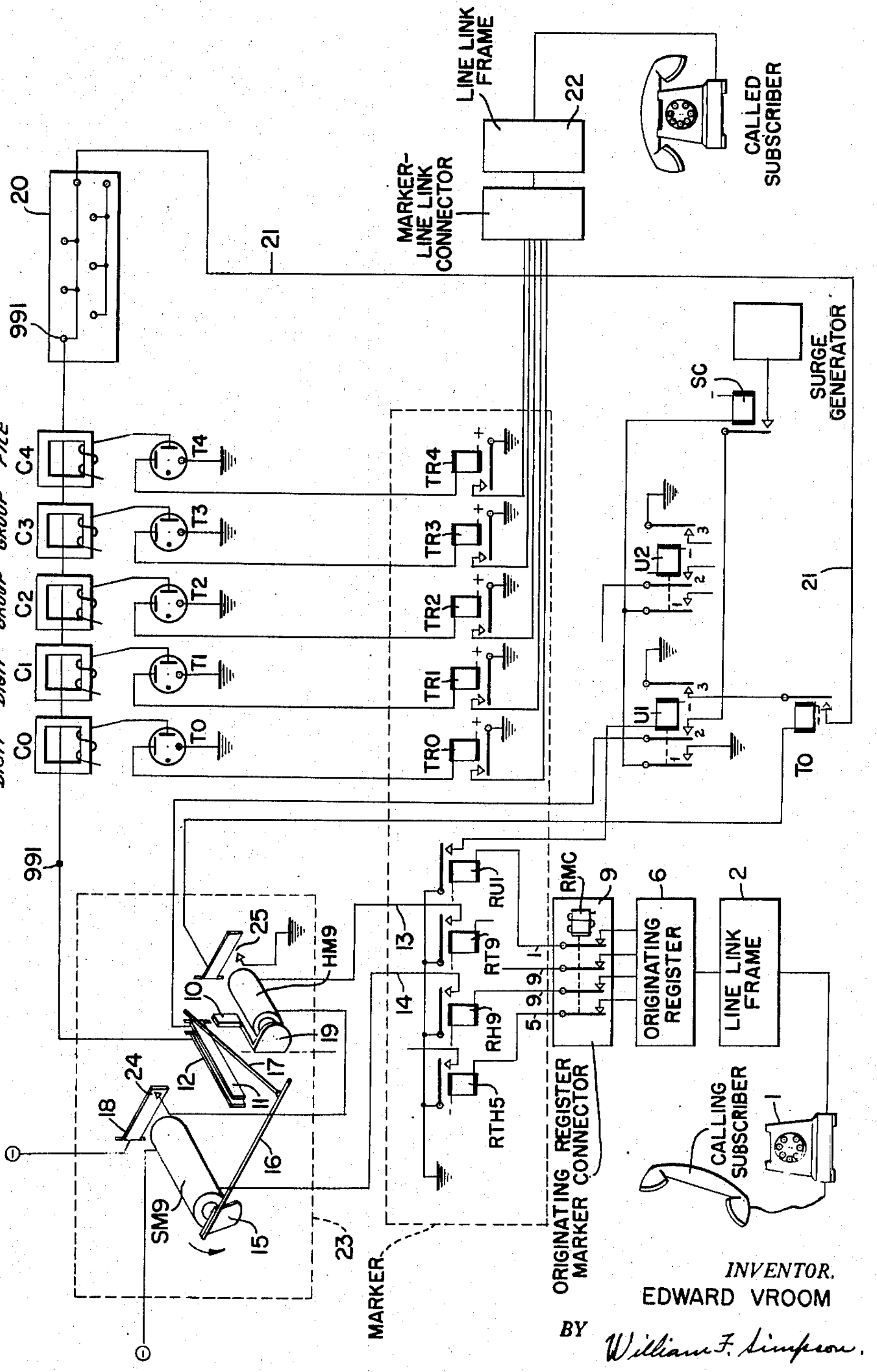

Fig. 9 shows in circuit form another cross-bar switch which is employed in the translation of P. B. X directory numbers;

Fig. 10 shows the circuit for selecting an idle trunk of a group of trunks extending to a wanted P. B. X and for connecting the surge generator to the jumper, identified with the idle trunk, which is threaded through the coils shown in Figs. 3 and 4;

Fig. 11 shows schematically a cross-bar telephone system in which the present invention is embodied;

Fig. 12 is a simplified drawing of a circuit embodying the invention in which certain parts are shown in greater detail than in the preceding figure;

Fig. 13 is an interrelation diagram showing the manner in which Figs. 1 to 10, inclusive, should be arranged in order to exhibit the complete circuit embodying the present invention.

Figure 14:
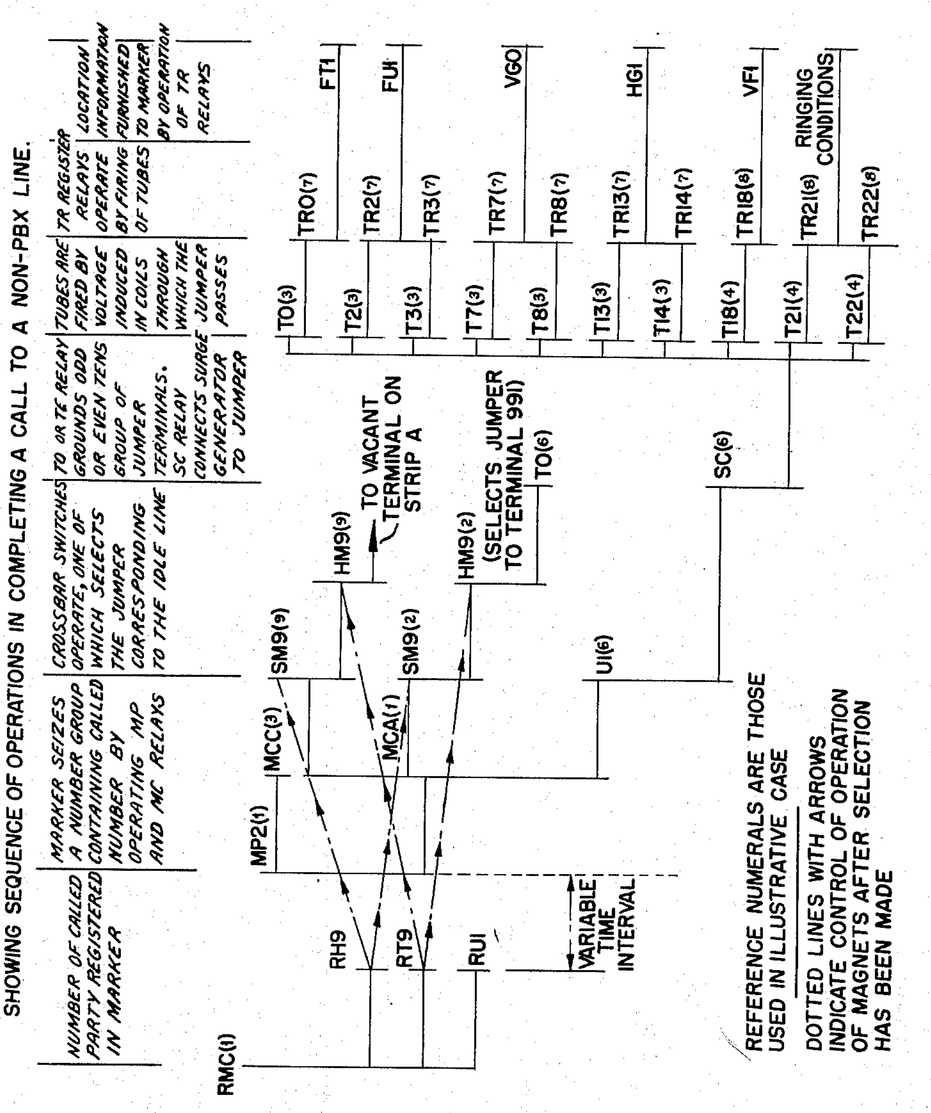
Figure 15:
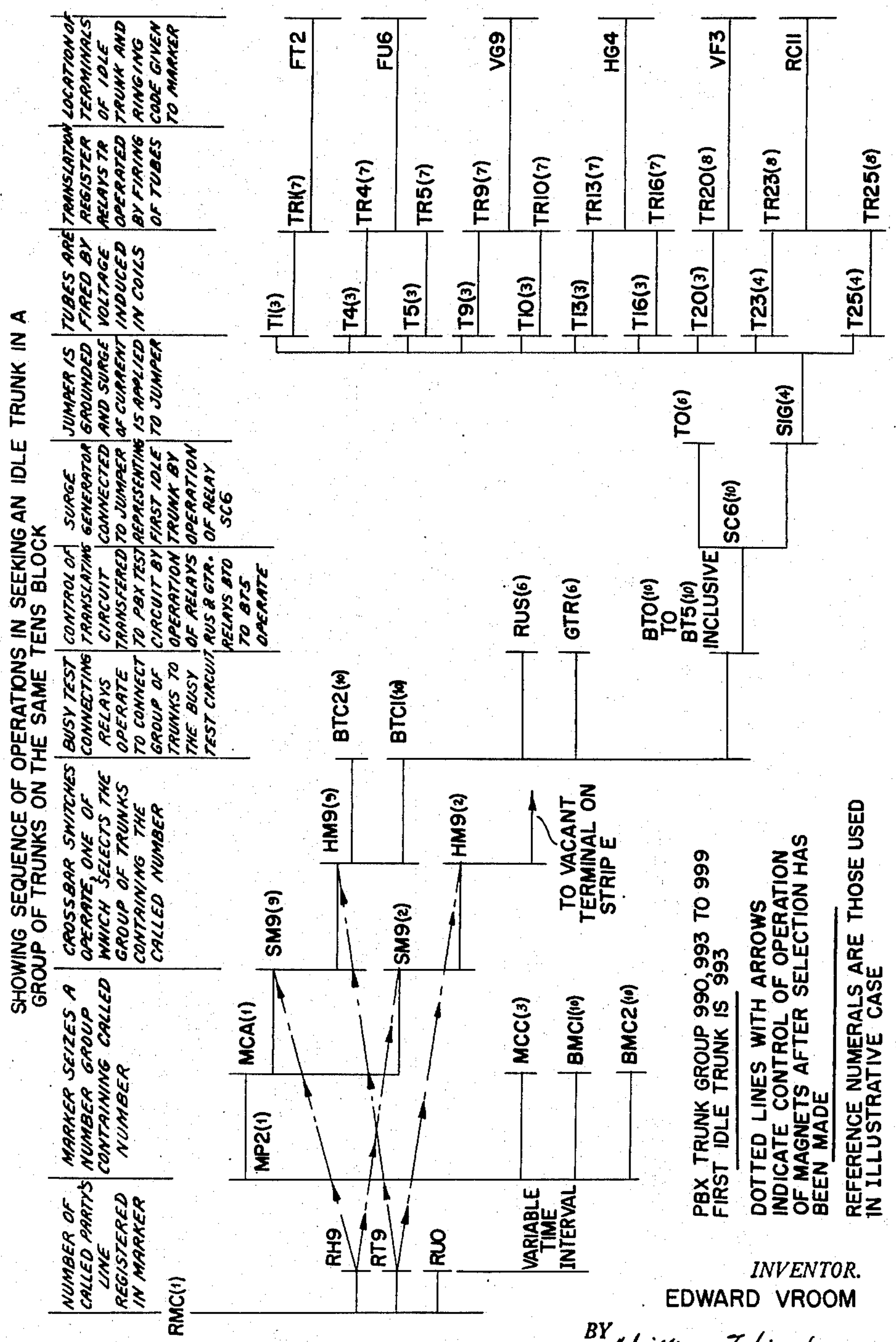
Figure 16:
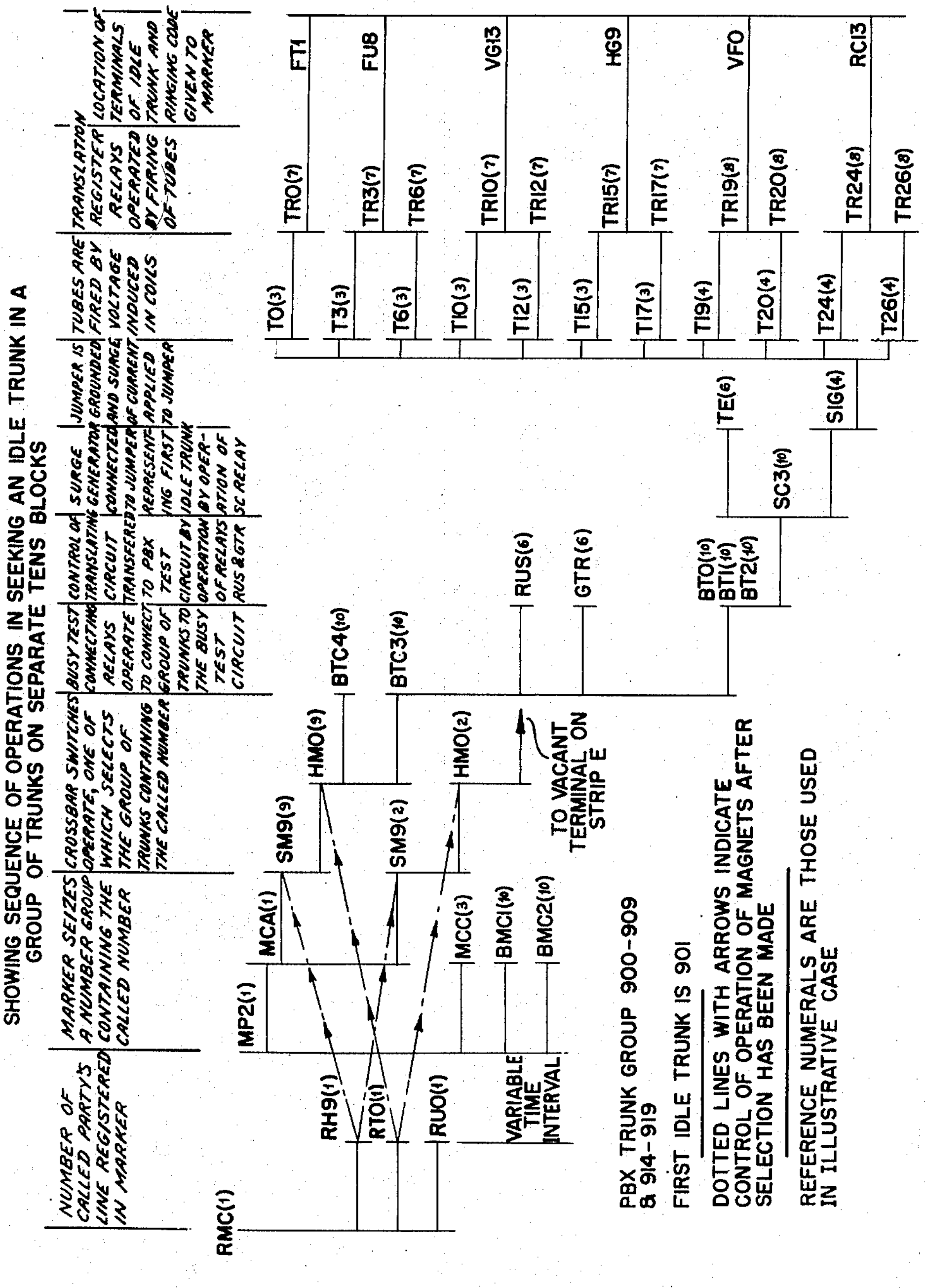

Figs. 14, 15 and 16 are timing charts that show the sequence of operation of the relays and tubes of the circuit shown by Figs. 1 to 10, inclusive, in performing the functions for which that circuit is designed.

Throughout the following description of the circuit in which this invention is embodied, and also upon the timing charts, the various parts of the apparatus employed in the circuit are marked by a letter or a combination of letters that indicates the function of such apparatus; and the position of the apparatus upon the drawing is shown by a numeral in parentheses representing the figure of the drawing wherein the apparatus appears.

The cross-bar system of automatic telephony with which the present invention may be employed, is shown upon the block diagram, Fig. 11, and will be described in order that the present invention and its relation to such system will be more readily understood. When the subscriber 1 originates a call in a cross-bar system, such as that represented by Fig. 11, the line-link frame 2 engages an idle marker 3 by means of the line-link marker connector 4, and identifies itself to the marker and informs the marker that a dialing connection is to be established. Thereafter the marker proceeds to select a trunk link frame such as 5 having an idle register 6 connected therewith and connects to that frame through the marker-trunk link connector 7. The marker then selects the idle register 6 and connects to it. Thereafter the marker connects to the line-link frame 2 through the line-link frame connector 8 and completes the identification of the calling line, a part of which, as mentioned above, was obtained through the line-link marker connector 4. When the idle register 6 has been seized by the marker 3, the marker selects one of ten channels that may be used to connect the calling subscriber with the register and operates the select and hold magnets of the switches to complete the channel and passes the identity of the line-link employed in the selected channel to the originating register 6. The marker 3 then releases its connections and upon the receipt of the dial tone from the register the subscriber 1 then dials the designation of the wanted line into the said originating register.

As soon as the registration has been completed, the originating register 6 seizes an idle marker (which may be No. 3 or another marker) through the originating register marker-connector 9 and transmits to the marker (which will be assumed to be that designated 3) the calling line location, that is, its position upon a given line-link frame, viz., 2, and its position with respect to the vertical group and the horizontal group of cross-bar switches, and the vertical file of the selected switch upon such frame. The register 6 also transmits to the marker 3 the directory number of the called party. From the office code the marker determines whether an intra-office call is desired or an outgoing connection. Assuming that an intra-office connection is indicated, the marker tests for and seizes by means of the trunk link connector 10, a trunk link frame such as 11 having an idle intra-office trunk. Thereafter, the marker connects to a number group, such as 12, in order to translate the directory number of the called line into information as to the particular line-link frame, such as 16, and the particular horizontal group, and vertical group of that frame in which the desired subscriber's switch is located, and the vertical file upon that switch upon which the called subscriber's line 13 terminates. The number group 12 also determines whether the called line is a party line, or a P. B. X trunk and transmits to the marker such information and also information as to the type of ringing current to be applied. The marker 3 then sets up a connection between the intra-office trunk 14 and the called line 13 and sets the switch by which the appropriate ringing current from the ringing code connector 15 will be applied to the line. The marker then releases its connection to the line-link frame 16 of the called subscriber. Assuming that that subscriber's line is not busy, the marker proceeds to select the line-link frame 2 of the calling line and thereafter it sets up the originating channel employing, if necessary, the line-link used in the dialing connection. The marker then releases the register 6 and itself, from the line-link frame 2 thus leaving the ringing and the supervision of the connection under the control of the trunk 14.

The system heretofore employed to translate the directory number of the called line required three terminals in the number group for each directory number to each of which terminals a jumper was connected; hence, whenever a subscriber's number was removed or added, three jumpers had to be changed. One of the objects of the present invention is to simplify this procedure by effecting the translation of the directory number of a called line into information as to the location of the hold magnet of the line upon that frame by the use of a single jumper. Another object of the invention is to simplify the method for testing and locating an idle P. B. X trunk and translating its directory number into an indication of the position of its hold magnet upon a line-link frame.

The basic principle of this invention will be clear from consideration of the simplified circuit shown on Fig. 12 which is that employed in translating the directory number of a called non-P. B. X subscriber's line to an indication of the location of the hold magnet of that line upon a line-link frame.

When the calling subscriber 1 has been connected to the originating register 6 through the line-link frame 2 in the manner previously described, the directory number of the wanted subscriber will be set up in the originating register 6 by the operation of the dial at the calling subscriber's telephone. The setting up of the called party's number in the originating register grounds certain leads extending from that register to the originating register-marker connector 9 through which the originating register is connected to the marker circuit 3. The relay in the marker connector 9, when operated, will effect the connection of 40 leads from the originating register to relays in the marker circuit. Ten of those leads extend to the windings of ten relays of the thousands group, ten leads extend to ten relays of the hundreds group, ten leads extend to ten relays of the tens group of relays, and, likewise, ten leads extend to ten relays of the units group of relays. For the sake of simplicity only one relay of each group, viz., RTH5, RH9, RT9, and RU1 have been shown.

Since the assumed directory number of the called party is 5991, lead 5 of the thousands group, lead 9 of the hundreds group, and also of the tens group, and lead 1 of the units group, are grounded in the originating register, and, in consequence, relays RTH5, RH9, RT9 and RU1 in the marker will be operated. Thereupon the marker will seize the number group circuit which is designed to translate the group of numbers 5000 to 5999. The manner in which the marker circuit seizes the number group circuit containing the wanted thousands group of numbers is clearly described in the copending application of A. J. Busch, Serial No. 57,394, filed October 29, 1948, now Patent No. 2,585,904, and, it is felt, need not be described herein.

After the marker has established contact with the number group, the relays RH9, RT9, and RU1 will effect the operation of a cross-bar switch and relays in the number group circuit by which the translation of the directory number into an indication of the position of the hold magnet of the wanted line upon a particular line-link frame and its specific location upon a cross-bar switch upon that frame may be determined. The operation of relay RH9 grounds the lead 14 which is connected to the winding of the selecting magnet SM9 (one of a plurality of similar selecting magnets) of a cross-bar switch which preferably is of the type described in the patent to Reynolds No. 2,021,329, dated November 19, 1935. The selecting magnet SM9 upon being energized attracts its armature 15 to which is fastened the bar 16 and thereby effects the rotation of that bar through a given angular distance in the direction represented by the arrow. As shown in said patent, the bar 16 is fastened to another armature which would be under the control of another selecting magnet by which the bar could be rotated in the opposite direction to that indicated by the arrow but for the sake of simplifying the drawing that armature and magnet have been omitted. Attached to the bar 16 is a selecting finger 17, which is one of a plurality, the purpose of which is to effect the closing of the contacts between a plurality of contact members, such as 11, 12, whenever the selecting finger has been moved into the space between the arm 10 and the contact member 11, and, thereafter, the arm 10 has been moved by the armature 19 against the finger. The movement of the armature 19 is controlled by the hold magnet HM9(12) (one of a plurality of similar hold magnets), the winding of which is connected between the contact point 24 of the armature 18 of the magnet SM9(12) and the contact point of the armature of the tens relay RT9(12). That arrangement ensures the operation, in sequence, of the magnets SM9(12) and HM9(12) even though the relays RH9(12) and RT9(12) are operated simultaneously, which is essential in order that the fingers of the cross-bar switch may be moved into position between the arm 10 and the contact members 11 and 12 before the arm 10 is moved by the hold magnet.

The contact member 12 of the cross-bar switch is connected to one of the terminals of that switch, viz., the terminal bearing the directory number 991 which is connected by a jumper to the same numbered terminal upon the terminal strip 20, said latter terminal being in turn connected by the lead 21 to the contact point of the tens odd relay TO(12). The jumper between the terminals 991 of the cross-bar switch and terminal 991 of the terminal strip 20, is inductively linked with each of a plurality of coils C0(12) to C4(12), inclusive. The winding of each of those coils is connected to one of the tubes T0(12) to T4(12), inclusive, which may be cold cathode tubes, hot cathode thyratrons, single shot multivibrators or any other device that will convert a low power high voltage current into a current suitable for operating a relay; each of those tubes is connected to one of the translator relays TR0(12) to TR4(12), inclusive, and, by means of those circuits, each comprising a coil, a tube, and a translator relay, the directory number is converted into an indication of the position of the hold magnet of the line bearing that number upon the line-link frame.

Relay RU1(12) is connected to the winding of the units relay U1(12), which is one of a group of such relays, each controlled by one of the relays of the units group in the register. Through contact 1 of relay U1(12) the winding of the slow operating relay SC(12) will be grounded and, when operated, it will connect the surge generator to the circuit of which the jumper between the terminal 991 of the cross-bar switch and terminal 991 of the terminal strip 20 forms part.

The manner in which the aforedescribed circuit operates to effect the translation of the directory number is as follows:

The subscriber at 1 upon receiving the dial tone will set up in the originating register the number of the called party by the operation of the dial at the subscriber's telephone set in the manner heretofore set forth in the description of Fig. 11. Thereafter the originating register 6 will connect to a marker by means of an originating register-marker connector 9 and, assuming the called number to be 5991, relays RTH5(12) of the thousands group, relay RH9(12) of the hundreds group, relay RT9(12) of the tens group, and relay RU1(12) of the units group, will thereby be operated. Relay RTH5(12) will seize a number group which is designed to translate the group of numbers between 5000 to 5999, the method of doing which is described in the copending application of Busch, previously referred to.

The operation of relay RH9(12) effects the operation of the selecting magnet SM9(12) of the cross-bar switch 23 in the number group circuit, which, by attracting its front armature 15 causes the selecting finger 17 to move into position between the arm 10 of the hold magnet and the contact members 11, 12, of the cross-bar switch. Upon the operation of the magnet SM9(12) a circuit will be closed through the back armature 18 of that magnet that will include the winding of the hold magnet HM9(12) which is grounded through the contact of relay RT9(12) in the marker. Thereupon that hold magnet will be energized and by attracting its front armature it will cause the arm 10 to press against finger 17 which in turn will press against the contact members 11—12 and cause the closing of the contact between them. At the same time through the attraction of the back armature 25 of the magnet HM9(12), the tens odd relay TO(12) (the purpose of which will be fully explained hereinafter) will be operated and will connect the lead 21 to the contact 3 of relay U1(12). That relay will be operated through the contact of relay RU1(12) in the marker. As previously mentioned, the closing of contact 1 of relay U1(12) energizes the slow operating relay SC(12) which will operate at the end of a prefixed interval of time sufficient to permit the operation of the other relays just mentioned. Upon the operation of relay SC(12) a circuit will be closed that will extend from the surge generator and include the contact of relay SC(12), contact 2 of relay U1(12), the contacting members 11—12 of the cross-bar switch, terminal 991 of that switch, the jumper extending to terminal 991 of the terminal strip 20, the lead 21, the contact of relay TO(12), contact 3 of relay U1(12) to ground. Thereupon a surge of current will flow over that circuit, and, in consequence thereof, a voltage will be induced in the windings of the coils C0(12) to C4(12), inclusive, that, in turn, will effect the firing of the tubes T0(12) to T4(12), inclusive. Upon the firing of those tubes the translator relays TR0(12) to TR4(12) will be operated. The operation of relays TR0(12) and TR1(12) indicates the tens digit and the units digit of the number of the line-link frame upon which is located the cross-bar switch upon which the wanted subscriber's line terminates. Those relays will, in turn, operate work relays in the marker that will establish a connection to the line-link frame 21 in the manner fully described in the application of Busch previously referred to.

Figure 3:
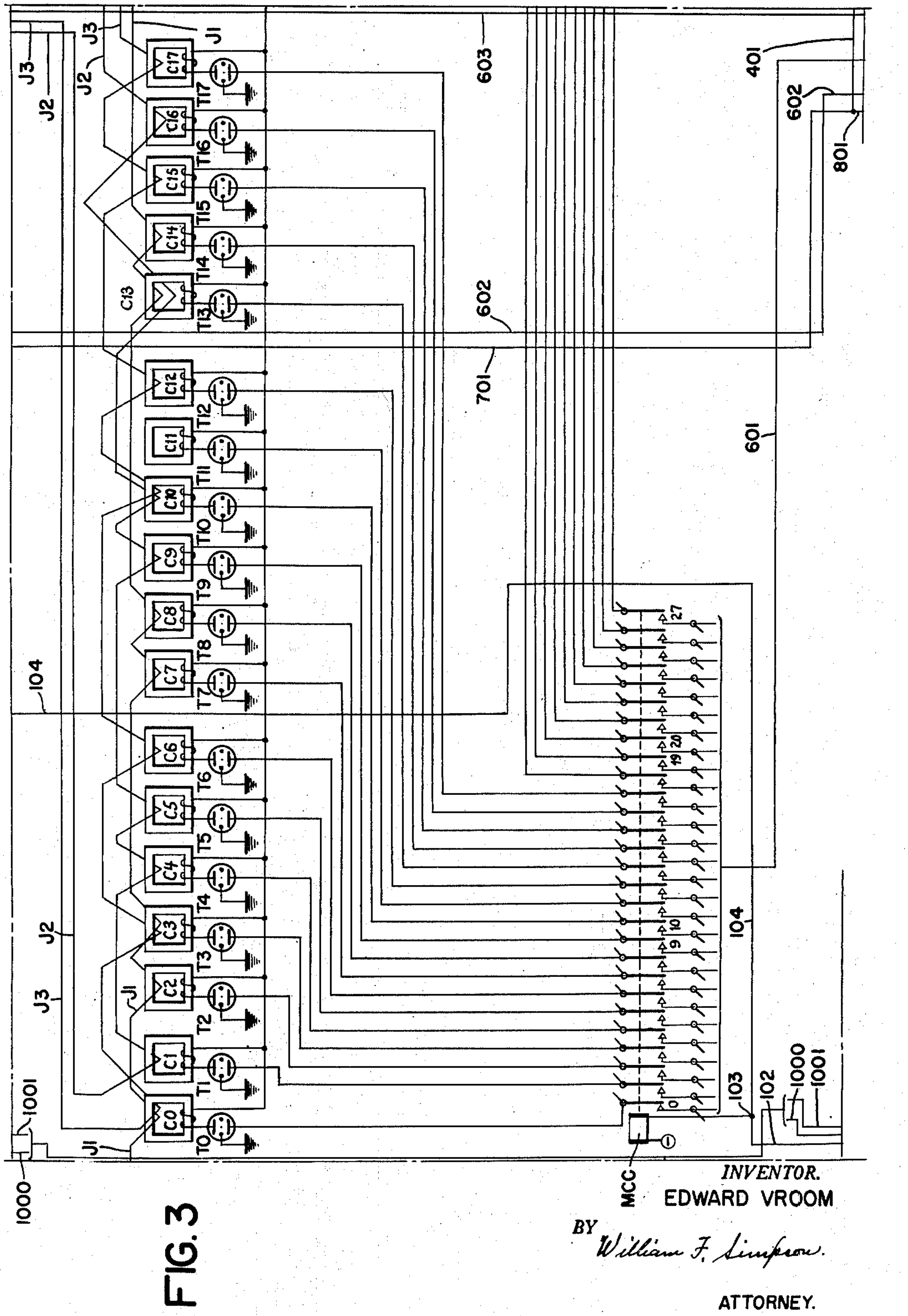
Figs. 3 and 4 show groups of coils and tubes employed in such translation; and also show a generator to supply a surge of current to a circuit including a jumper threaded through the said coils to effect the translation of the directory number.
Figure 4:
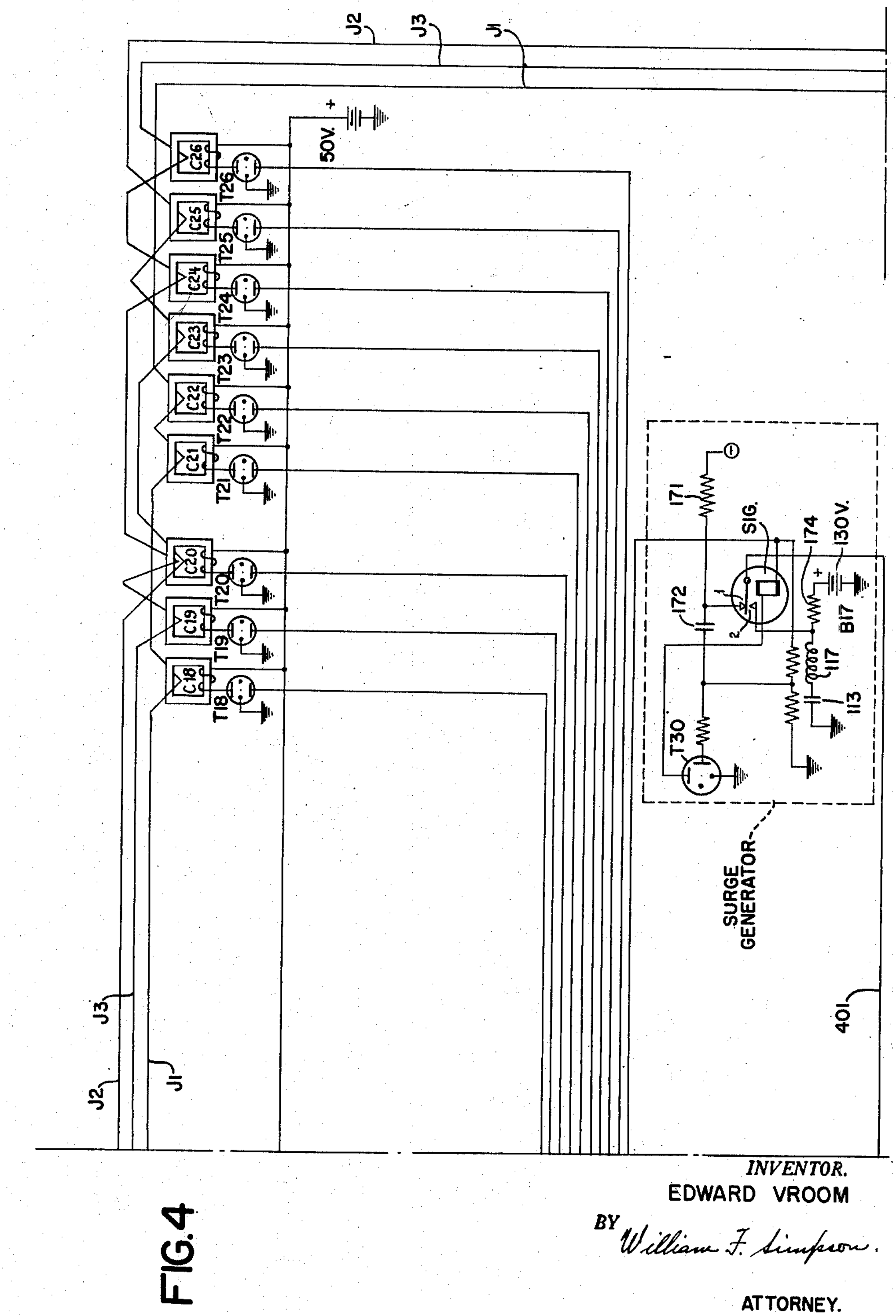

The operation of relays TR2(12), TR3(12) and TR4(12) serves to indicate the position of the desired cross-bar switch in a vertical group and a horizontal group of such switches and the vertical file in which the hold magnet of the wanted subscriber's line lies. By means of additional coils as shown in Figs. 3 and 4, further information is given to the marker circuit, such as, in the case of party lines, whether the ringing current should be applied to the tip or ring side of the line, and also the type of ringing current to be employed in order that the marker will be able to perform desired acts upon the subscriber's line thus located.

Only one coil is shown for each of the frame tens and frame units groups, but it is to be understood that the frame tens group and frame units group should have a sufficient number of coils to enable the identification of any frame out of say 40 frames upon which the wanted line may appear. Likewise, instead of a single coil, as shown, for determining the vertical and horizontal positions of the desired cross-bar switch, and also the specific vertical file on that switch in which the hold magnet of the wanted line lies, a group of coils would be provided to perform each of those functions as shown in Figs. 3 and 4. With the provision of an adequate number of coils, the translation or conversion of the directory number of a line to an indication of the location of the hold magnet of the line upon a particular line-link frame depends upon the choice of the coils through which the jumper passes.

As soon as the location of the hold magnet of the wanted line has been made, the number group circuit is released so that it may be used by another marker to locate the hold magnet of another wanted line. Thereafter, as mentioned in describing Fig. 11, the marker will proceed to test that line to determine whether it is busy or idle, and if idle the marker will proceed to establish a connection between the line-link frames of the calling subscriber's line and the called subscriber's line, the manner of doing which has been described hereinbefore.

Having in mind the basic principle involved in the applicant's system for translating the directory number of a wanted telephone line into an indication of the position of the terminals of that line upon a line-link frame, the circuit shown in Figs. 1 to 10, inclusive, to effect such translation will first be described, and thereafter the mode of operation of that circuit in connection with the making of a call to a non-P. B. X line, and, later, in connection with the finding of an idle P. B. X trunk in a group of such trunks, and the manner in which the directory number of such line or trunk is translated to an indication of the location of its hold magnet upon a line-link frame.

Figure 1:
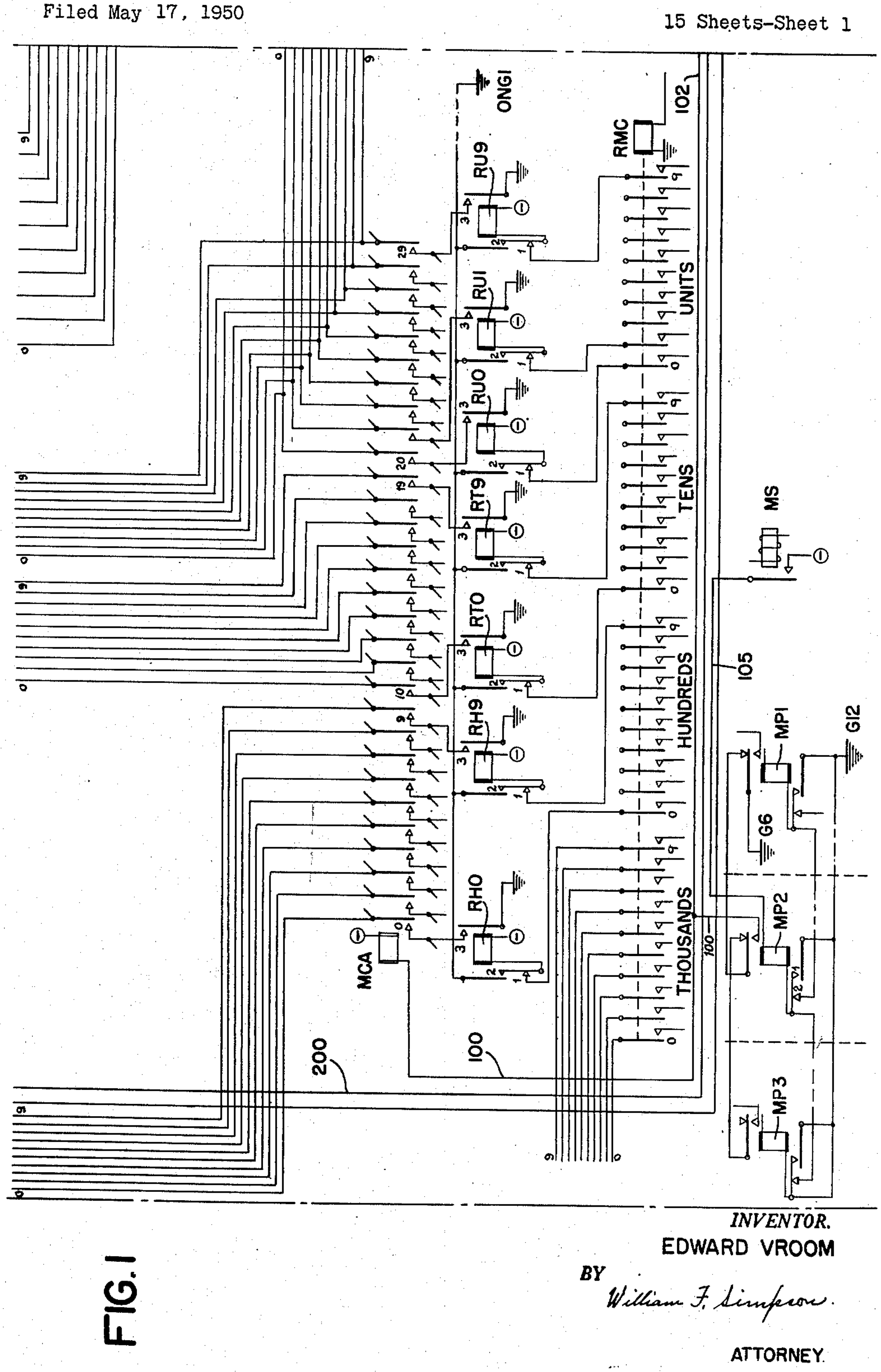

As shown in Fig. 1, the thousands, hundreds, tens, and units leads from the connector between the originating register and the marker terminate upon the contacts of the register-marker connector relay RMC(1). The armatures of the thousands group extend to relays (not shown but fully described in the aforesaid Busch application) by which the number group containing the directory number of the wanted line may be selected. The armatures of the hundreds group, the tens group, and the units group of relay RMC(1) are connected through contacts to the windings of ten relays of the hundreds group, RH0(1) to RH9(1), ten relays of the tens group, RT0(1) to RT9(1), and ten relays of the units group, RU0(1) to RU9(1). Contact 3 of each of the relays of the hundreds, tens, and units groups is connected to contacts of the marker connecting relay MCA(1), the hundreds leads being connected to contacts 0 to 9, inclusive, of relay MCA(1), the tens leads to contacts 10 to 19, inclusive, and the units leads to contacts 20 to 29, inclusive, of that relay.

Figure 2:
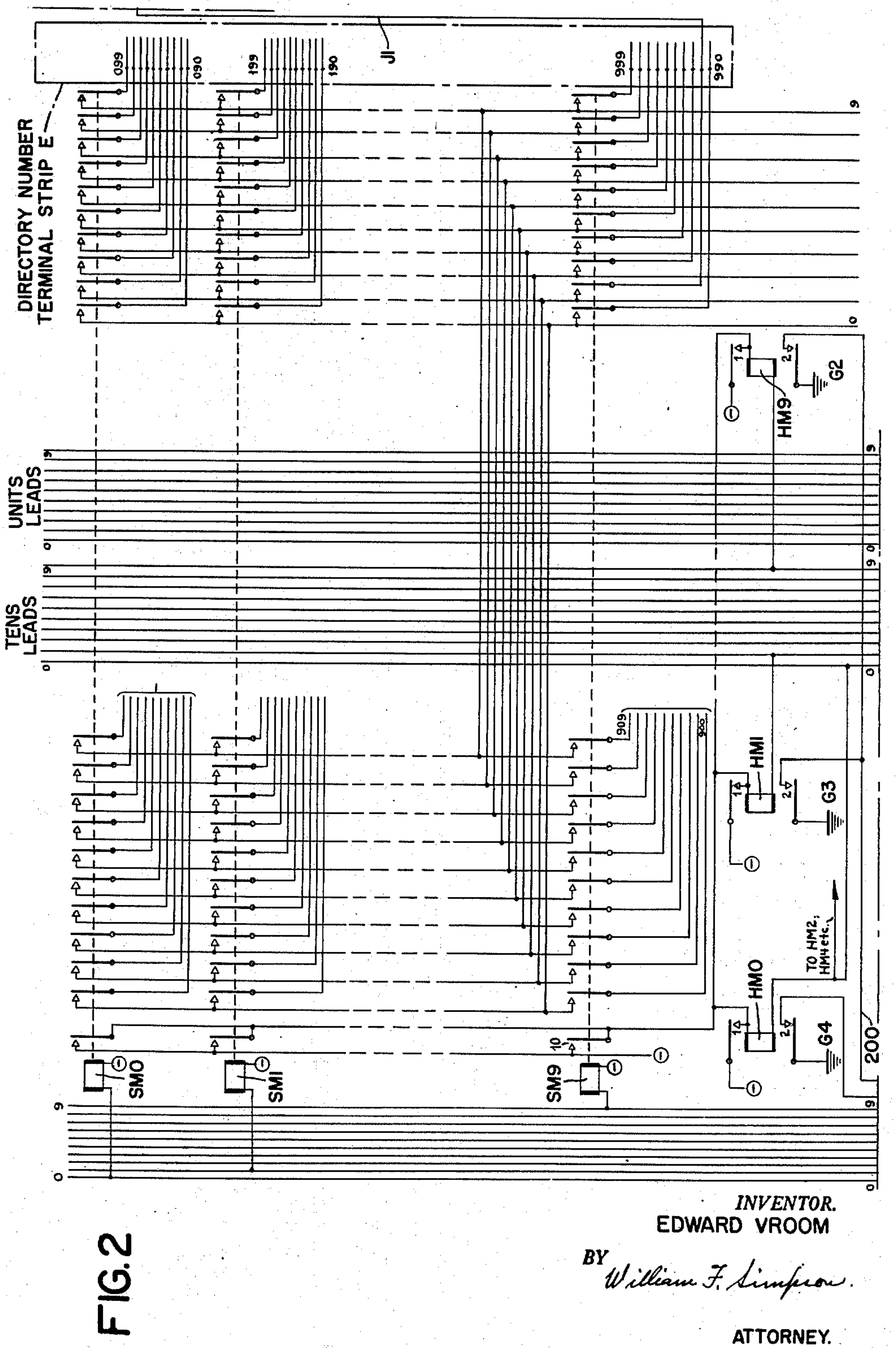

Each of the armatures 0 to 9 of the hundreds groups of the marker connecting relay MCA(1) is connected to the winding of one of the select magnets SM0(2) to SM9(2) of the cross-bar switch shown in circuit form on Fig. 2, and those armatures are connected also to similar select magnets SM0(9) to SM9(9) shown on Fig. 9. Likewise, each of the armatures 10 to 19, inclusive, of the tens group of the marker connecting relay MCA(1) is connected to the winding of one of the hold magnets HM0(2) to HM9(2) of the cross-bar switch shown in Fig. 2 and also to similar hold magnets HM0(9) to HM9(9) shown in Fig. 9.

Figure 5:
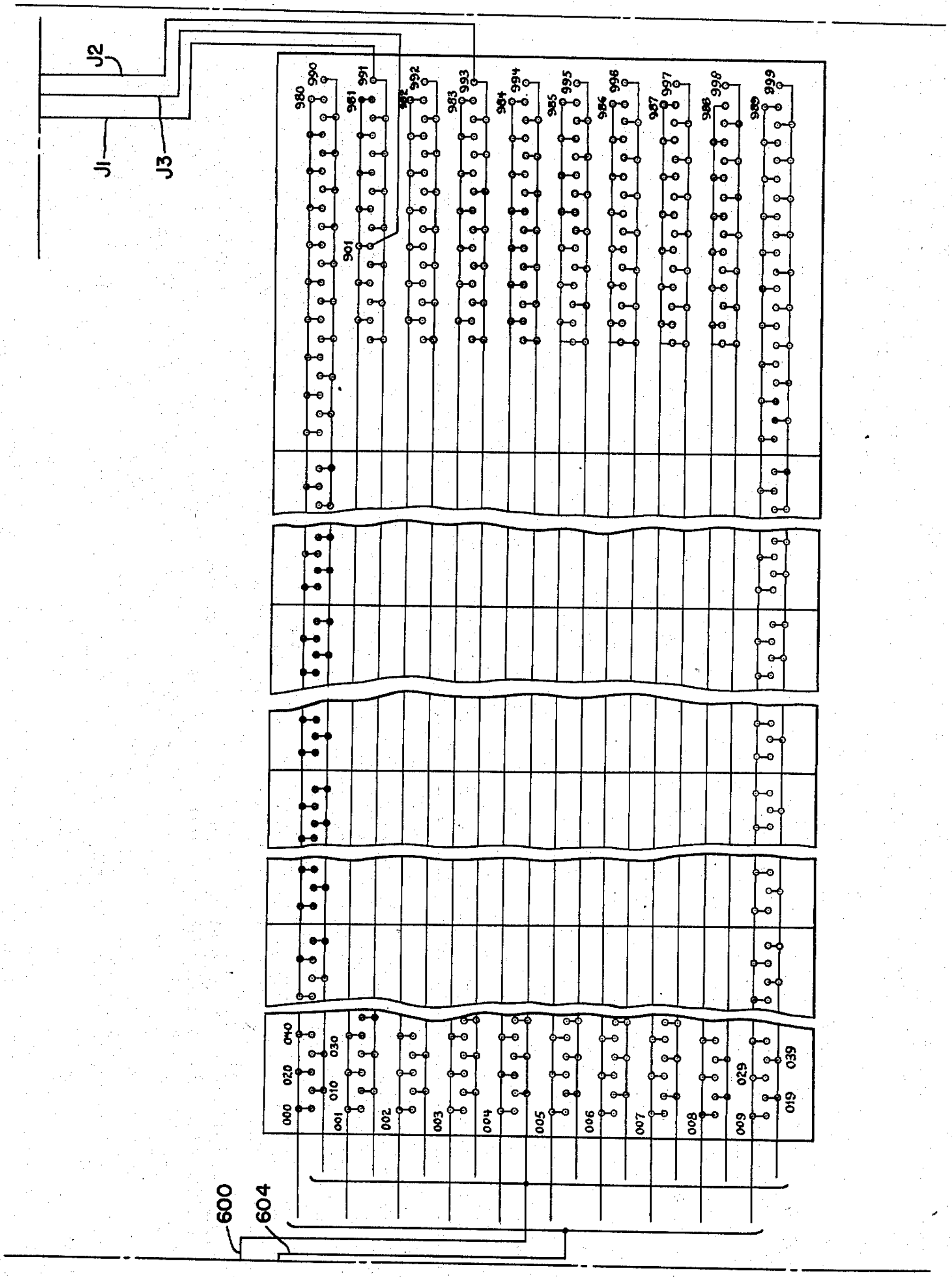
Fig. 5 shows a terminal strip upon which the jumper terminates after passing through the said coils.
Figure 6:
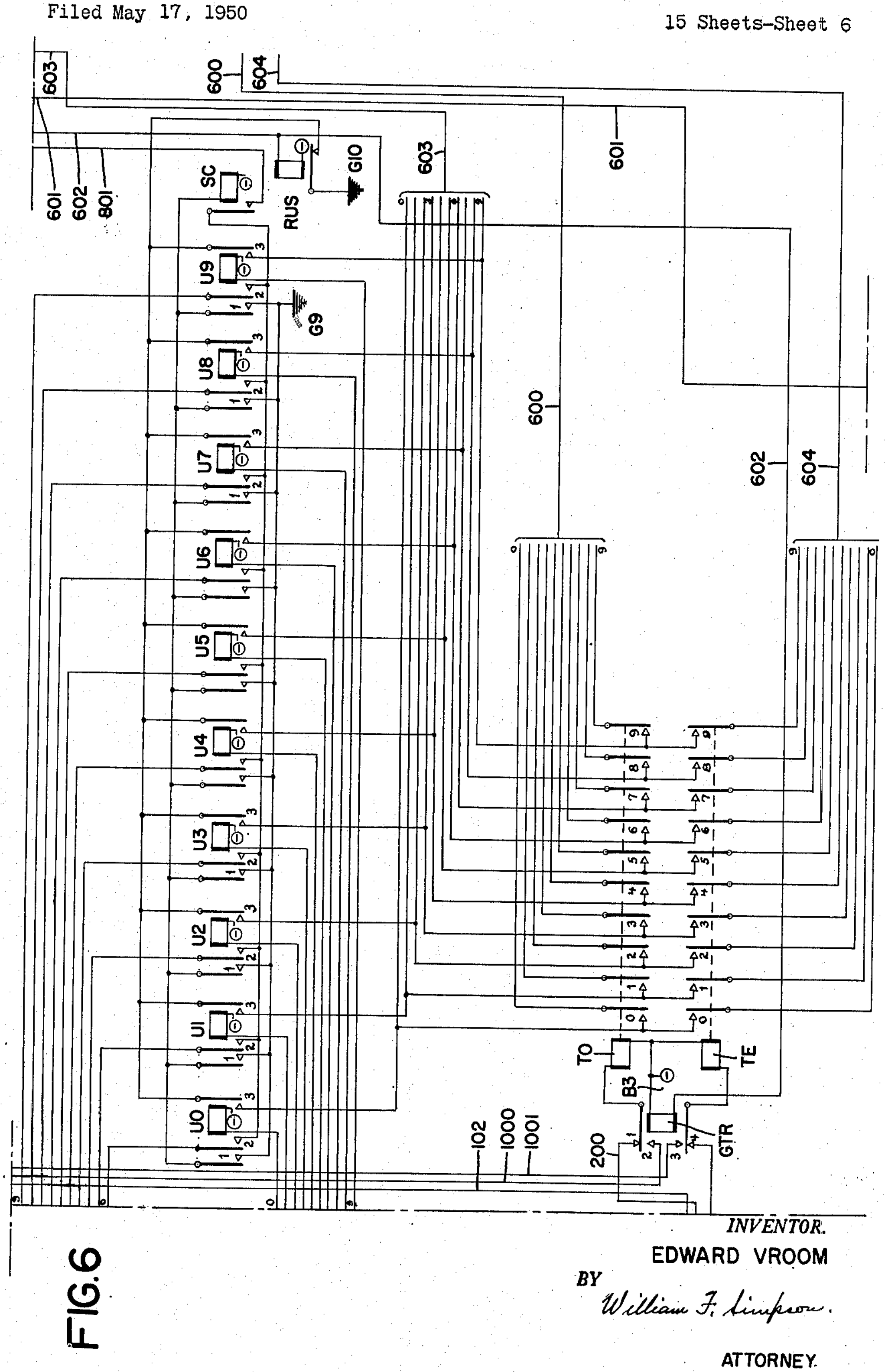
Fig. 6 shows a group of relays each responsive to the closing of a circuit corresponding to one of the units digits of the directory number.
Figure 7:
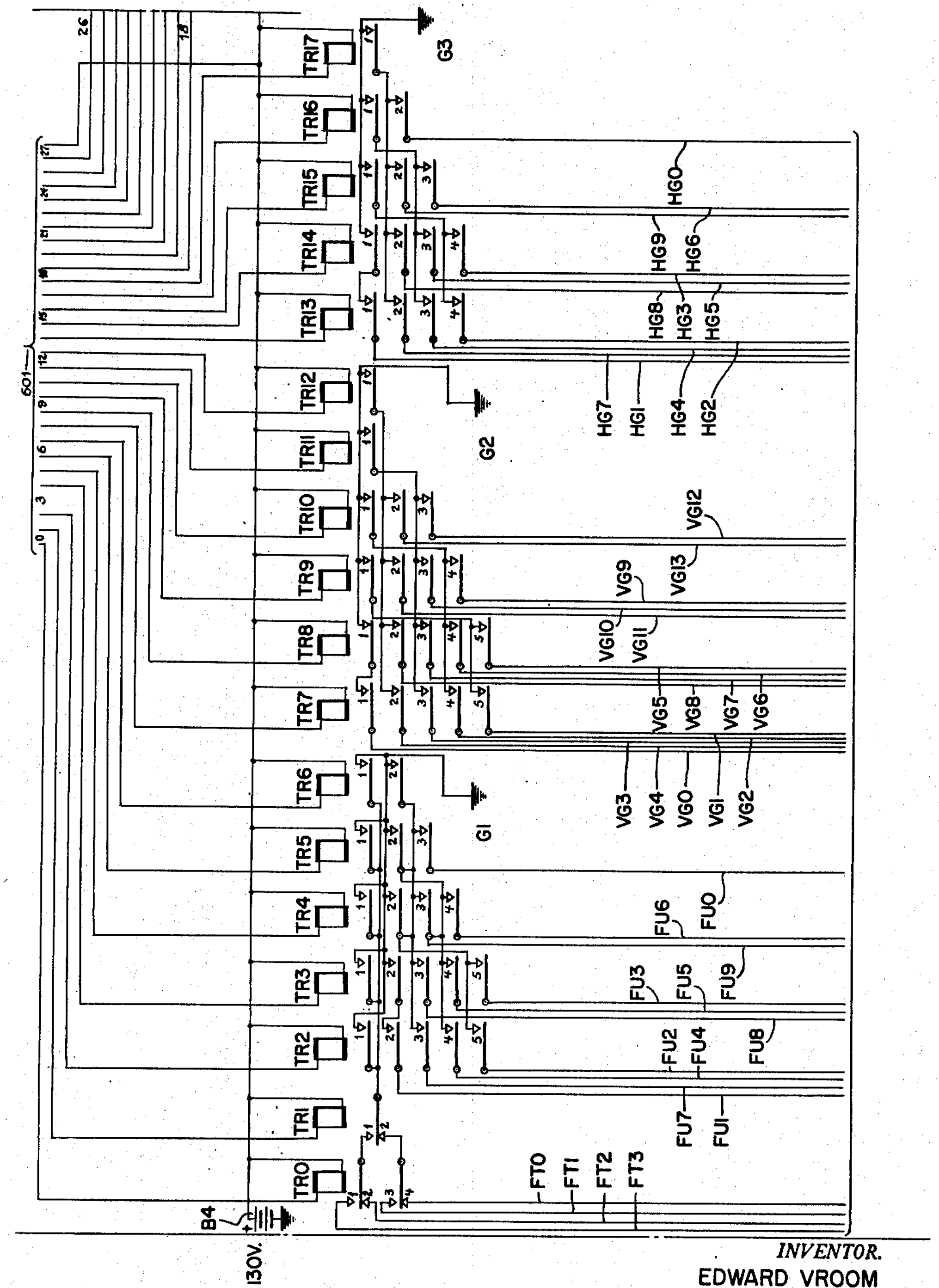
Figs. 7 and 8 show translator relays in the marker circuit responsive to the action of the tubes associated with the coils shown in Figs. 3 and 4.
Figure 8:
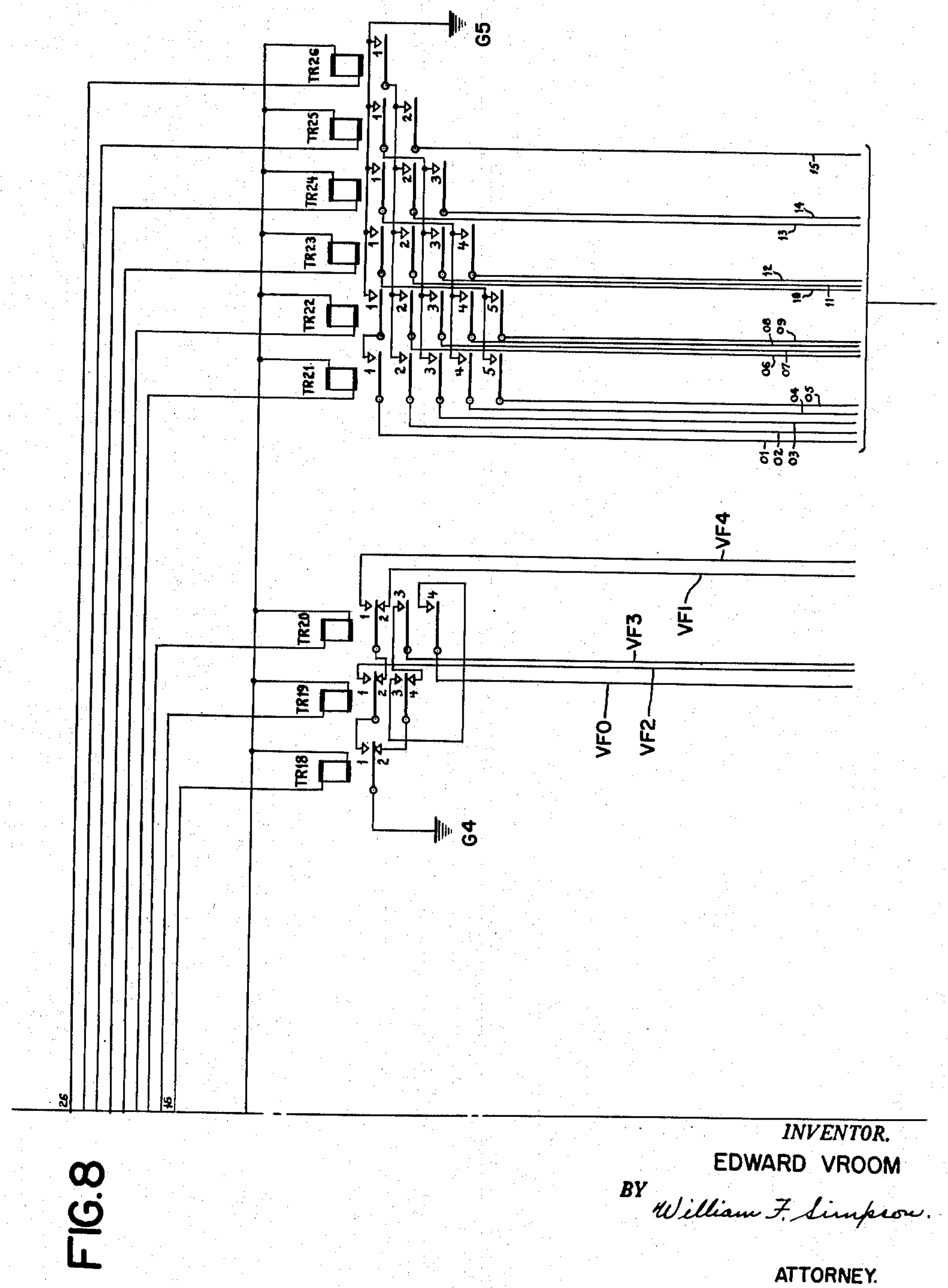

The leads that extend from the units group of armatures 20 to 29 of the marker connecting relay MCA(1) are divided into two branches, one of which extends to the units relays U0(6) to U9(6), inclusive, shown in Fig. 6, and the other branch extends to the units contacts of the cross-bar switch shown on Fig. 9. The cross-bar switches represented by the circuits of Figs. 2 and 9, are preferably those shown and described in the Patent to J. N. Reynolds, No. 2,021,329, dated November 19, 1935, mentioned hereinbefore. The units relays U0(6) to U9(6) are connected by leads 0 to 9 to the units contacts of the cross-bar switch shown on Fig. 2, and each armature of that switch is connected to one of of a thousand terminals upon the directory number terminal strip E shown on Fig. 2. Those terminals are numbered in sequence and they may represent the directory numbers of P. B. X trunks as well as non-P. B. X lines. The terminals having the numbers of non-P. B. X lines are connected by jumpers to terminals upon the terminal strip shown on Fig. 5 which terminals bear the same directory numbers as the corresponding terminals upon the terminal strip E. The terminals having directory numbers of P. B. X trunks are blank upon terminal strip E. In extending from terminal strip E to the terminal strip on Fig. 5, the jumper is threaded through a selected combination of coils of the group C0 to C26, inclusive, which are arranged in subgroups ranging from two to six coils each, the combination including one or more coils of each subgroup. Each of those coils is connected to one of the cold cathode tubes T0 to T26, inclusive, or equivalent devices which will be rendered conductive by a voltage induced in the winding of the coil by a surge of current flowing over the jumper which inductively links the said coil. Each of the tubes T0 to T26 is connected to the winding of one of the translator relays in the marker, TR0(7) to TR26(8), inclusive, and by the operation of certain of said latter relays, in the manner hereinafter fully described, the marker is enabled to identify the location of the hold magnet of the wanted subscriber's line and to effect the necessary operations for the final setting of the switches to complete the call.

*Method of translating the directory number of a called non-P. B. X line and completing the call*

(SEQUENCE OF OPERATIONS CHART FIG. 14)

The manner in which the circuit functions to translate the directory telephone number of a non-P. B. X line to an indication of the location of the hold magnet of that line upon a line-link frame, is as follows:

Assuming that the directory number of the wanted line is 5991, the marker will seize the number group circuit which is designed to effect the translation of directory numbers lying within the range of numbers 5000 to 5999. In seizing the number group circuit one of the preference relays of the group MP1(1) to MP3(1) will be operated by current transmitted over the start lead 105 from the marker in the manner described in the application of Busch heretofore referred to, the starting arrangement being represented on Fig. 1 merely by the relay MS and the battery B5 by which current may be applied to the start lead. That arrangement prevents the seizing of a number group by a marker during the time in which the said number group is being employed by another marker. Assuming that the marker preference relay MP2(1) has been so operated, relays MCA(1), MCC(3), and busy test marker connector relays BMC1(10) and BMC2(10) will be operated over a circuit from ground G5(1) that includes contact 2 of relay MP1(1), contact 1 of relay MP2(1), the lead 100(1) to the junction 101(1), where the circuit branches, one branch extending to the winding and battery of the marker connecting relay MCA(1), and the other branch extending over lead 102(1) to the junction 103(3) where the circuit again divides, one branch extending to the winding and battery of the marker connecting relay MCC(3) and the other branch extending over lead 104(3) to the windings and batteries of the busy test marker connecting relays BMC1(10) and BMC2(10), thereby effecting the operation of all of said relays. The busy test marker connecting relays BMC1(10) and BMC2(10) perform no function in completing a call to a non-P. B. X line but serve to connect the marker circuit to the busy test circuit shown on Fig. 10, which is used solely for selecting idle P. B. X trunks. Accordingly, the manner in which the latter relays perform their function will be explained hereinafter in describing the mode of operation of the number group circuit when the called directory number is that of a P. B. X trunk.

The operation of relay RMC(1) will close its 40 contacts and thereby will effect the connection to the marker circuit of the ten leads of the thousands group, the ten leads of the hundreds group, the ten leads of the tens group, and the ten leads of the units group, from the originating register in which the number of the wanted non-P. B. X line has been registered by the dialing operation of the calling party. Since each armature of relay RMC(1) of the hundreds, tens and units groups is connected to the winding of one of the register relays of the hundreds, tens and units groups, one relay in the hundreds group, one in the tens group, and one in the units group will be operated by a ground in the originating register (not shown) upon the leads that represent the digits of the called directory number.

For the assumed number 5991, the lead 9 of the hundreds group, the lead 9 of the tens group, and the lead 1 of the units group will be grounded in the originating register, and, in consequence, relays RH9(1), RT9(1) and RU1(1) will be operated and will lock through their contacts 2 to the off-normal ground ONG1. The operation of those relays grounds the lead 9 of the hundreds group, lead 9 of the tens group and lead 1 of the units group. The grounding of lead 9 of the hundreds group effects the operation of the selecting magnets SM9(2) and also SM9(9) of the cross-bar switches shown in Figs. 2 and 9, but the operation of magnet SM9(9) has no effect upon the operation of the circuit in completing a call to a non-P. B. X line and therefore may be disregarded.

The operation of the selecting magnet SM9(2) prepares the way for the closing of the entire group of 100 contacts across the width of the cross-bar switch in Fig. 2 by the placing of selecting fingers in the path of action between each group of ten contacts of the switch and the holding bar associated with that group. Upon the energization of one of the hold magnets the holding bar associated with a particular tens group will be moved and will close the ten contacts of that group. Thus the grounding of the lead 9 of the tens group of leads by the operation of relay RT9(1) will effect the operation of the hold magnet HM9(2) by closing a circuit that includes the battery B1, contact 10 of the selecting magnet SM9(2), the winding of the hold magnet HM9(2), the lead 9 of the tens group, contact 19 of relay MCA(1), contact 3 of relay RT9(1) and ground. Upon the closing of contact 1 the hold magnet HM9(2) will lock over a circuit from battery B2 to ground upon contact 3 of relay RT9(1). The closing of contact 2 of the magnet HM9(2) effects the operation of the tens-odd relay TO(6) by closing a circuit that includes ground G2(2), contact 2 of HM9(2), lead 200, contact 1 of the ground transfer relay GTR(6), winding of relay TO(6) and battery B3, the purpose of which operation will later be apparent. The operation of the magnet SM9(2), which is followed instantly by the operation of the hold magnet HM9(2), closes the group of ten contacts designated 990 to 999, through which contacts the units leads from the armatures 2 of units relays U0(6) to U9(6) extend to the terminals 990 to 999 of the directory number terminal strip E shown on Fig. 2. That terminal strip has thereon 1000 terminals numbered 000 to 999, and each of those terminals will, if it represents a non-B. B. X line, be connected by a jumper that will extend through a group of coils to a correspondingly numbered terminal upon the ground terminal strip shown on Fig. 5. Accordingly, the terminal 991 (which corresponds numerically to the directory number of the wanted non-P. B. X line, viz., 5991) is connected by the jumper J1 to terminal 991 of the ground terminal strip shown on Fig. 5. The said jumper is threaded through coils C0, C2, C3, C7, C8, C13, C14, C18, C21 and C22, and when the circuit, of which the jumper forms part, is connected to a surge generator, a voltage will be induced in the said coils which will fire their respective tubes and thereby will effect the operation of the respective translator relays shown on Figs. 7 and 8, the manner of doing which will presently be described. For reasons that will be fully stated hereinafter, the ground terminal strip shown on Fig. 5 is so arranged that the 1000 terminals appearing thereon are grouped according to whether the tens digit of the directory number is odd or even, and those odd and even groups of terminals are connected by leads to the armatures of the tens-odd relay TO(6) and the tens-even relay TE(6), respectively. For the purpose of classification, 0 is regarded as an even number and is included with 2, 4, etc., in the even group. The odd group includes, obviously, 1, 3, 5, 7 and 9. Thus the terminals 000, 020, 040, etc., which are of the even tens group are strapped together and are connected by a lead in cable 604 to the armature 0 of the tens-even relay TE(6). Terminals 010, 030, etc., which are of the odd tens group are likewise strapped together and are connected by a lead in cable 600 to the armature 0 of the tens-odd relay TO(6). Since, in the assumed directory number, viz., 5991, the tens digit is an odd number, terminal 991 of the ground terminal strip (Fig. 5) would, therefore, be connected to the armature 1 of the tens-odd relay TO(6). Relay TO(6) is now in its operated condition, having been energized by the closing of contact 2 of the hold magnet HM9(2) and by the closing of the contacts 0 to 9 of relay TO(6) the ten leads of the cable 600 are connected to the contacts 3 of the units group of relays U0(6) to U9(6).

Since the units digit of the called number is 1, relay U1(6) will have been operated by the closing of a circuit that extends from ground upon the armature of relay RU1(1) through contact 21 of relay MCA(1), to the winding of relay U1(6), and a circuit will be closed that will extend from ground upon contact 1 of relay U1(6) and include the winding of the slow-operating relay SC(6). The operation of relay SC(6) is delayed sufficiently to provide time for the closing of other relay contacts, the purpose of which will presently appear.

Through contact 3 of relay U1(6) a circuit is closed from ground G10, through the back contact of relay RUS(6), to contact 1 of relay TO(6).

When relay SC(6) operates at the end of the prefixed period of time, a circuit will be closed that may be traced from battery B25 through resistance 171, contact 1 of relay SIG(4), leads 401 and 801, contact 2 of relay U1(6), the lead 1 of the units cable to contact 991 of the cross-bar switch shown on Fig. 2, thence to terminal 991 of the directory number terminal strip E, jumper J1 extending through the coils C0, C2, C3, C7, C8, C13, C14, C18, C21 and C22 as shown on Figs. 3 and 4, to terminal 991 on the ground terminal strip, lead 1 in cable 690 to the contact 1 of relay TO(6), contact 3 of relay U1(6) to ground G10(6) upon the armature of relay RUS(6).

The sudden change in potential on the right plate of capacitor 172 of the surge generator shown in Fig. 4 due to the closure of ground to it will cause the gas-filled tube T39 to fire from the ground on its cathode to its control anode. The tube will then conduct through its main anode and will thereby operate relay SIG(4). The latter thereupon transfers the jumper J1 (which is immediately connected to the armature of SIG(4)) from the resistance 171 to the surge generating circuit consisting of the capacitor 113, inductor 117 and resistance 174. The capacitor 113 is charged to the voltage of the positive battery B17, of the order of 130 volts, until relay SIG(4) operates. It then discharges through inductor 117, contact 2 of relay SIG(4) and over the circuit previously traced through the jumper J1 to ground. This discharge current will be a gradually decaying oscillation, and the oscillatory current in the jumper will cause it to operate as a primary winding of one turn thereby setting up a voltage in the said coils which will cause the tubes T0, T2, T3, T7, T8, T13, T14, T18, T21 and T22 associated with the said coils, to fire. The firing of these tubes effects the operation of one or more of the relays of each of the tranlator groups shown in Figs. 7 and 8, which enables the marker to identify the location of the hold magnet of the line having the directory number 991 and to effect the necessary operations for the final setting of the switches to complete the call. The firing of the tube T0(3) effects the operation of relay TR0(7) by closing a circuit extending from battery B4, shown on Fig. 7, and including the winding of translator relay TR0(7), lead 70 of the cable 601, contact 0 of relay MCC(3) (which was operated by the marker preference relay MP2 when the marker seized the number group in which the directory number was located), the tube T0(3), which is now conductive. Accordingly, relay TR0(7) will close its contact 1 and the position of its armature relative to the position of the armature of relay TR1(7) determines the tens digit of the number of the line-link frame upon which the hold magnet of the called line is located. The firing of tubes T2(3) and T3(3), which are associated with coils C2 and C3 of the frame units group, effects the operation of relays TR2(7) and TR3(7) of the translator relay circuit, thereby closing the five contacts of each of those relays.

The process of selection by the translator relays of the particular line-link frame upon which a wanted line terminates, is based upon the simultaneous operation of two out of five or two out of six relays, depending upon whether there are five or six relays in the group operated upon. Assuming that there are forty frames in the office and that they are arranged in four groups of ten frames each, the search for the location of the hold magnet of the wanted line is in the first instance narrowed down to a determination of the group in which the wanted line is located, and thereafter determining which one of the frames in that group of ten frames contains the terminals of the wanted line. The selection of the group of ten frames in which the wanted line may appear is controlled by relays TR0(7) and TR1(7), and that selection is made effective by the operation of at least one of the relays TR2(7) to TR6(7), inclusive. With at least one of the relays TR2(7) to TR6(7) operated, the ground G1(7) will be connected to the armature of relay TR1(7) and through a contact of that relay to one of the armatures of relay TR0(7). The contacts of the latter relay are attached to the frame tens leads FT0(7), to FT3(7) that extend to relays in the marker that effect the connection of the marker to the desired group of frames. The selection of the desired group depends upon the relative positions of the armatures of relays TR0(7) and TR1(7), as indicated by the following table.

| Relay TR0(7) | Relay TR1(7) | Group of Frame Selected |
|---|---|---|
| Unoperated | Unoperated | 0 to 9. |
| Operated | do | 10 to 19. |
| Unoperated | Operated | 20 to 29. |
| Operated | do | 30 to 39. |

After the desired group has been selected, the next step is to select the particular frame in that group in which is located the cross-bar switch upon which terminates the wanted line. The selection of the particular frame, one out of ten, is effected by the operation of two out of the five relays of the group TR2(7) to TR6(7), inclusive, in the following manner:

Upon the operation of relays TR2(7) and TR3(7) the armature of relay TR1(7) will be grounded at G1(7) and that will, in turn, ground one of the armatures of relay TR0(7) which will effect the operation of the frame tens relay in the marker corresponding to the tens digit of the desired frame. Since, as previously mentioned, relay TR0(7) alone is operated, the wanted frame obviously lies within that group of frames numbered 10 to 19, inclusive. The selection of the particular frame in that group will in this instance be made by relays TR2(7) and TR3(7), the operation of which closes a circuit which extends from the frame units lead FU1(7) through contacts 2 of both of the latter relays to ground G1(7), thereby indicating that the cross-bar switch having the hold magnet of the wanted line is to be found on frame 11.

Having identified the particular line-link frame upon which is located the cross-bar switch having the hold magnet of the wanted line, the next step is to determine the position of the switch upon that frame by its position in a vertical group and a horizontal group of such switches, and the location of the particular vertical file in which lies the hold magnet of the wanted line. This is accomplished in the following manner:

The firing of the tubes T7(3) and T8(3) effects the operation of relays TR7(7) and TR8(7), and in like manner the firing of tubes T13(3) and T14(3) effects the operation of relays TR13(7) and TR14(7). Those relays are so arranged that the operation of two out of five, or two out of six, as the case may be, will control the selection of the particular vertical group and horizontal group of cross-bar switches in which the wanted switch may lie. Thus, through contacts 1 of both relays TR7(7) and TR8(7) the ground G2(7) will be connected to the vertical group lead VG0(7) that controls a relay in the marker which effects the selection of the vertical group of switches in which the wanted switch lies. Similarly, the operation of relays TR13(7) and TR14(7), as the result of the firing of the tubes T13(3) and T14(3), effects the closing of all contacts of each of those relays. Through contacts 1 of each relay a circuit is established that extends from ground G3(7) to the horizontal group lead HG1(7) to operate a relay in the marker by which a selection is made of the proper horizontal group in which lies the wanted switch.

Having thus located the position upon a line-link frame of the particular switch upon which the wanted line terminates, the next step is to locate on that switch the particular vertical file in which lies the hold magnet of the wanted line. This selection is made in the following manner:

Upon the firing of tubes T18(4), T19(4) and T20(4), relays TR18(8), TR19(8) and TR20(8) will be operated, and by virtue of the operation of one or two relays of the group and the non-operation of the remaining relay or relays of that group as shown by the following table, one out of five vertical file leads may be grounded which will identify to the marker the vertical file in which lies the hold magnet of the cross-bar switch that represents the wanted line.

| Relays | | | Vertical File Selected |
|---|---|---|---|
| TR18 | TR19 | TR20 | |
| Not operated | Operated | Operated | VF0 |
| Operated | Not operated | Not operated | VF1 |
| Do | Operated | do | VF2 |
| Not operated | Not operated | Operated | VF3 |
| Operated | do | do | VF4 |

The location of the hold magnet of the wanted line is now known. The next step (assuming that that line is not busy) is to determine and to apply to that line the type of ringing current required to operate the signaling device at the subscriber's station. That is determined by the operation of two out of six relays TR21(8) to TR26(8), inclusive. Since the jumper J1 is threaded through coils C21 and C22, the tubes T21(4) and T22(4) will be fired and will operate relays TR21(8) and TR22(8); that will serve to connect the ground G5(8) through the contacts 1 of those relays to the ringing current lead RC01(8). As previously mentioned, the marker then sets up a connection between the intra-office trunk and the called line and sets a switch by which the appropriate ringing current from the ringing code connector 15, shown on Fig. 11, will be applied to the line. Thereafter the marker releases its connection to the line-link frame of the called party and the process of connecting the calling and the called lines continues as set forth hereinbefore in the description of Fig. 11.

*Method of hunting an idle P. B. X trunk in a group of trunks all confined to the same tens block of terminals and translating its directory number*

(SEQUENCE OF OPERATIONS CHART FIG. 15)

The method of hunting for an idle trunk in a group of trunks extending to a given P. B. X and translating the directory number of the idle trunk to an indication of the particular line-link frame upon which is located the hold magnet of the cross-bar switch upon which the trunk terminates is as follows:

Assuming that the directory number of the first trunk of the group is 5990, and that the marker has seized the number group which is arranged to translate all directory numbers falling within the group of numbers ranging from 5000 to 5999, the number group will thereafter effect the translation of the number 990 to an indication on the marker of the location upon a line-link frame of the hold magnet of the trunk having that directory number; and if that trunk is busy the number group circuit will search for an idle trunk in the group of trunks extending to the same P. B. X, and upon finding an idle trunk it will proceed to translate the number of that trunk to an indication of the position of its hold magnet.

The seizing of the number group by the marker is effected by the operation of the marker preference relays MP1(1) to MP3(1) which, in turn, operate the marker connecting relays MCA(1), MCC(3) and the busy test marker connector relays BMC1(10) and BMC2(10), the manner of doing which is fully set forth hereinbefore in describing the method of completing a call to a non-P. B. X line.

Since the assumed number of the called P. B. X trunk is 5990, the last three digits will be registered by the operation of relays RH9(1), RT9(1) and RU0(1) in the manner hereinbefore fully described and those relays will then lock through their contacts 2 to the off-normal ground ONG1(1). The operation of relay RH9(1) will close a circuit extending from ground through its contact 3 and contact 9 of relay MCA(1) to the select magnets SM9(2) and SM9(9), the windings of which magnets are in parallel.

As described hereinbefore, the operation of a select magnet renders possible the closing of ten contacts of the said switch by the subsequent operation of one of the hold magnets HM0, HM1, etc., each of which is under the control of one of the tens group of relays RT0(1) to RT9(1). Accordingly, since relay RT9(1) of the tens group has operated, a circuit will be closed from ground upon the armature of that relay that will include its contact 3, contact 19 of relay MCA(1) and the tens lead extending to the winding of the hold magnet HM9(9) and the battery B6(9), thereby effecting the operation of that magnet which presses together the group of ten contacts 990 to 999, inclusive, shown on Fig. 9.

The select magnets SM9(2) and SM9(9), the hold magnets HM9(2) and HM9(9) and relay U0(6) operate simultaneously. Since the called number is that of a P. B. X trunk the terminal, namely, No. 990 on terminal strip E, Fig. 2, to which the zero lead from relay U0(6) extends, is blank, that is, it has no jumper connected thereto and consequently the operation of the unit relay U0(6) cannot cause interference with the process of hunting the P. B. X trunk having the same terminal number.

The closing of the contacts 990 to 999 of Fig. 9, connects the ten units leads from relay MCA(1) to the terminals of the directory number terminal strip A shown on Fig. 10. Assuming that the trunks extending to a given P. B. X embrace the group extending from 990 to 999 with the exception of trunks numbered 991 and 992, all trunks within the group extending to the said P. B. X will be strapped together and connected to the windings of the busy test connecting relays BTC1(10) and BTC2(10), each of which windings is connected to a grounded battery. Thereupon relays BTC1(10) and BTC2(10) will be operated by the closing of a circuit that extends from battery and includes the windings of the said relays, lead 990 extending from terminal strip A(10) to contact 990 of the cross-bar switch, Fig. 9, lead 0 of the units leads extending through contact 20 of relay MCA(1) and contact 3 of the units relay RU0(1) to ground. The closing of contact 22 of relay BTC1(10) grounds the lead 602(10) and thereby effects the operation of relays RUS(6) and GTR(6). Relay RUS(6), upon operating, opens the lead from the ground G10(6) to the contacts 3 of the units relays U0(6) to U9(6) and thereby prevents the grounding of one of the contacts of the TO or TE relays, shown on Fig. 6, which otherwise would result from the operation of relay U0(6). The ground transfer relay GTR(6) which is in parallel with relay RUS(6), is operated by the closing of a circuit that extends from battery B3(6) and includes the winding of relay GTR(6), conductor 602(6), contact 22 of relay BTC1(10), and ground G14(10). The operation of relay GTR(6) transfers the control of the tens odd and tens even relays TO(6) and TE(6) from the cross-bar switch shown on Fig. 2 to the busy test circuit shown on Fig. 10, the purpose of doing which will presently appear.

As previously mentioned, the busy test marker connecting relays BMC1(10) and BMC2(10) were operated by the grounding of their windings when one of the marker preference relays MP1(1) to MP3(1) was operated. The closing of contacts 0 to 19 of relay BTC1(10) serves to connect to the busy test relays BT0(10) to BT19(10), inclusive, the leads extending from the sequence of terminals 990 to 999 of terminal strip B, Fig. 10, and also the intervening terminals of that terminal strip. Those terminals of terminal strip B bearing the directory numbers 990 and 993 to 999, inclusive, are cross-connected to the hold magnets of the cross-bar switch upon which terminate the trunks having the directory numbers that extend to the called P. B. X. Thus, for example, the terminal 990 is connected to a hold magnet HM990 of the cross-bar switch upon which trunk 990 is terminated, and terminal 993 is connected to hold magnet HM993 of that switch. Similarly, terminals 994 to 999 of the terminating strip B are connected to hold magnets of the same or of other cross-bar switches upon which those trunks terminate. Terminals 991 and 992, which are not connected to the hold magnets or trunks, are grounded at G11. All terminals of the sequence 990 to 999, both inclusive, of terminating strip B are connected through the contacts of relays BTC1(10) and BMC1(10), to alternate busy test relays BT0(10), BT2(10), BT4(10), etc. The intervening terminals on terminating strip B are strapped together and grounded at G7(10), and are connected through the contacts of relays BTC1(10) and BMC1(10) to the sequence of relays BT1(10), BT3(10), etc., of the busy test group. Since the said intervening terminals and also terminals 991 and 992 (which are not connected to hold magnets) are permanently grounded, the busy test relays connected to those terminals will operate whenever relays BTC1(10) and BMC1(10) operate.

The relays of the busy test group BT0(10), BT1(10), BT2(10), etc., control the surge generator connector relays SC0(10), SC1(10), SC2(10), etc., and it is by virtue of the fact that the busy test relays connected to the said intervening terminals and also the non-working terminals such as 991 and 992 of terminal strip B are always operated upon the operation of relays BTC1(10), and BMC1(10), that the testing circuit may be extended until the busy test relay connected to an idle trunk is reached and its associated surge generator connector relay thereby operated.

Assuming that the trunk connected to terminal 990 of strip B is busy (as indicated by the ground symbol in dotted lines upon that lead), and further assuming that the trunk connected to terminal 993 is idle, the busy test relay BT0(10) will be operated but relay BT6(10) will remain unoperated. Since the intervening relays BT1(10) to BT5(10), inclusive, which are connected to grounded terminals on terminal strip B will also be operated, a circuit will be established from ground G14 that will include contacts 22 and 20 of relays BTC1(10) and BMC1(10), respectively, the armature of relay BT0(10), the contacts 1 of relays BT0(10) to BT5(10), inclusive, the armature and contact 2 of relay BT6(10), and the winding of relay SC6(10) which will thereby effect the operation of relay SC6(10) and the closing of its three contacts. Upon the finding of an idle trunk the selecting circuit thereupon proceeds in the following manner to translate its directory number into the location of the hold magnet of the trunk. The closing of contact 2 of relay SC6(10) effects the operation of the tens odd relay TO(6), the operating circuit extending from ground G13(10) and including contact 2 of relay SC6(10), contact 34 of relay BMC1(10), conductor 1000(10), contact 2 of relay GTR(6), the winding of relay TO(6), and the grounded battery B3(6). The closing of the contacts of relay TO(6) serves to connect the leads from the odd tens terminals of the ground terminal strip shown on Fig. 5 to the ten leads of cable 603(6) which extend to the ten contacts 22 to 31, inclusive, of relay BMC1(10). Through the closing of contacts 1 and 3 of relay SC6(10) a circuit is established from the battery B25 of the surge generator shown on Fig. 4 which includes contact 1 of relay SIG(4), leads 401 and 701, contact 21 of relay BMC1(10), contact 1 of relay SC6(10), contacts 6 of relays BMC2(10) and BTC2(10), terminal 993 of the terminal strip C, shown on Fig. 10, the jumper J2 extending from that terminal through coil C1 of the frame tens group, coils C4 and C5 of the frame units group, coils C9 and C10 of the vertical group, coils C13 and C16 of the horizontal group, all shown on Fig. 3, coil C20 of the vertical file group, and coils C23 and C25 of the ringing code group, all shown on Fig. 4, to terminal 993 of the ground terminal strip shown on Fig. 5, thence over units lead 3 in cable 600, contact 3 of relay TO(6), lead 3 in cable 603, contact 25 of relay BMC1(10), contact 3 of relay SC6(10), to ground G8(10). The closing of that circuit causes a sudden change in potential on the right plate of capacitor 172 of the surge generator, Fig. 4, and effects the firing of the tube T30 which will conduct through its main anode and operate relay SIG(4). As fully described hereinbefore the closing of contact 2 of that relay effects the connection of the surge generating circuit to the lead 401. Upon the discharge of the capacitor 113 through the inductor 117, a surge of current will be transmitted through jumper J2 to ground G8(10). The surge of current through the coils with which the jumper J2 is linked will effect the firing of the tubes associated with the respective coils, and, when fired, a circuit will be established from the ground connection of each of those tubes that will include the corresponding contacts of relay MCC(3), the leads in cable 601(6) and the windings of the translator relays of each of the groups of relays TR0—TR26 shown in Figs. 7 and 8, that are connected with the tubes that have been fired.

The firing of tube T1(3) associated with coil C1 will operate relay TR1(7), and the firing of tubes T4(3) and T5(3) will effect the operation of relays TR4(7) and TR5(7). The operation of relay TR1(7) and relays TR4(7) and TR5(7) grounds the frame tens lead FT2(7) which controls the selection by the marker of the group of line-link frames 20 to 29, the selecting circuit extending from ground G1(7) and including contacts 1 of relays TR4(7) and TR5(7), contact 1 of relay TR1(7), contact 2 of TR0(7) and the lead FT2(7) to a relay in the marker, not shown, by which a connection is established with the group of line-link frames in which the specific line-link frame will be found having the terminals of the wanted P. B. X trunk. The operation of the frame units relays TR4(7) and TR5(7) establishes a circuit from ground G1(7) through contact 2 of TR5(7) and contact 4 of TR4(7) to frame units lead FU6(7) thereby identifying the particular frame, namely, 26, upon which the wanted trunk line terminals are located and enabling the marker to effect a connection to the circuit of that frame.

The firing of tubes T9(3) and T10(3) effects the operation of relays TR9(7) and TR10(7) and through their contacts 4 and 1, respectively, the vertical group lead VG9(7) will be grounded at G2(7) and thereby will operate relays (not shown) in the marker that will enable it to locate the vertical group of cross-bar switches in which will be found the particular switch upon which the wanted trunk terminates. The firing of tubes T13(3) and T16(3) will operate relays TR13(7) and TR16(7), which, through their contacts 3 and 1, respectively, will ground at G3(7) the lead HG4(7) which, in turn, will operate a relay (not shown) in the marker that will determine the horizontal group in which the cross-bar switch containing the terminals of the wanted P. B. X trunk is located.

Having thus located the particular cross-bar switch in which the hold magnet of the wanted trunk is located, the particular vertical file of that switch upon which that magnet is located will be determined by the operation of relays TR20(8) as the result of the firing of the tube T20(4). The operation of relay TR20(8) establishes a circuit from ground G4(8) that includes contact 2 of relay TR18(8), contact 4 of relay TR19(8), contact 3 of relay TR20(8) and extends to a relay (not shown) in the marker that controls the operation of the hold magnet connected with the vertical file 3 upon the cross-bar switch which has been identified by the operations described hereinbefore as the location of the wanted P. B. X trunk.

After having identified the location of the terminals of the P. B. X trunk corresponding to the assumed directory nunmber, viz., 993, the number group circuit determines the type of ringing current required for the particular trunk. This information is given by the operation of relays TR23(8) and TR25(8) which, by the closing of contacts 3 and 1, respectively, puts the ground G5(8) upon the ringing current lead RC11(8) which extends to a relay in the marker circuit, not shown, which enables that circuit to set the ringing current switch so that the proper ringing current may be applied to the selected P. B. X trunk after the connection between the calling line and the called line has been established through the intra-office trunk.

*Method of hunting an idle P. B. X trunk in a group of trunks extending over more than one tens block of terminals and translating its directory number*

(SEQUENCE OF OPERATIONS CHART FIG. 16)

When a group of P. B. X trunks is not confined to a single tens block as in the case heretofore described, but extends over the whole or a portion of two or more tens blocks, the mode of operation in hunting an idle trunk is as follows:

Let it be assumed that the last three digits of the directory number of the first trunk of a group of trunks extending to a P. B. X are represented by 900, and that the last three digits of the subsequent directory numbers of the trunks of that group are represented by the numbers 901 to 909, inclusive, of one tens block, and 913 to 919, inclusive, of the succeeding tens block. As mentioned hereinbefore, the practice is to list in the telephone directory the first number of the trunk group extending to a P. B. X, so that hunting for an idle trunk will begin with the first trunk of the group. Accordingly, in the case assumed, the subscriber will dial the number 900 to the originating register, which, in turn, will operate relays RH9(1), RT0(1) and RU0(1) in the marker circuit shown in Fig. 1. The operation of those relays will ground the lead 9 of the hundreds group, and leads 0 of the tens and units groups, which leads are connected through the contacts of relay MCA(1) to the cross-bar switches shown in Figs. 2 and 9. The grounding of lead 9 of the hundreds group effects the operation of the selecting magnets SM9(2) and SM9(9) of those cross-bar switches, and since the zero lead of the tens group of leads has been grounded by the operation of the register relay RT0(1), the operation of the aforesaid selecting magnets will effect the operation of the hold magnets HM0(2) and HM0(9), respectively, of the cross-bar switches shown on Figs. 2 and 9. The operating circuit for magnet HM0(9) extends from battery B6(9) and includes contact 10 of selecting magnet SM9(9), winding of magnet HM0(9), lead 0 of the tens group of leads, contact 10 of relay MCA(1) and ground on relay RT0(1). Similarly, the operating circuit for magnet HM0(2) extends from battery B1(2) and includes contact 10 of magnet SM9(2), winding of magnet HM0(2), lead 0 of the tens group to ground as traced above. The select magnets SM9(2) and SM9(9), the hold magnets HM0(2) and HM0(9) and relay U0(6) operate simultaneously. Relay U0(6) is ineffective since the terminal on terminal strip E (in Fig. 2) to which lead 0 from relay U0(6) is connected, namely, No. 900, is a blank terminal, that is, there is no jumped connected thereto. Accordingly, the operation of the unit relay U0(6) cannot result in the sending of a surge of current through the coils of the translator when the call is for a P. B. X trunk.

The operation of the selecting magnets SM9(9) and HM0(9) effects the closing of the units contacts 0 to 9 controlled by those magnets and connects the nine units leads of the cross-bar switch, numbered 900 to 909, to the correspondingly numbered terminals of the terminal strip A(10). Since the units lead 0 is grounded through the armature of relay RU0(1), a circuit is established from that ground that includes contact 20 of relay MCA(1), the units lead 0, contact 900 of the cross-bar switch shown on Fig. 9, terminal 900 of the terminal strip A(10), and the windings of the busy test connecting relays BTC3(10), BTC4(10) and their grounded batteries, thereby effecting the operation of those relays. Not only is terminal 900 connected to those busy test connecting relays, but all terminals upon that terminal strip bearing the directory numbers of the trunks that extend to the given P. B. X are connected to the said relays so that the grounding of any terminal of a group of terminals identified with a given P. B. X will effect the operation of those busy test connecting relays. The operation of relay BTC3(10) effects the operation of relay GTR(6) by the closing of a circuit that includes the ground G17(10), contact 32 of relay BTC3(10), lead 602, the winding of relay GTR(6) and the grounded battery B3(6). The operation of relay GTR(6) disconnects the windings of the tens odd and tens even relays TO(6) and TE(6) from the contacts of the hold magnets of the cross-bar switch shown on Fig. 2, and connects those windings to armatures of the surge generator connector relays SC0(10), SC1(10), etc., so that relays TO(6) and TE(6), will thereafter be under the control of the said surge generator connector relays.

Terminals 910 to 919, inclusive, on terminal strip B, Fig. 10, are connected through the contacts of relays BTC3(10) and BMC1(10) to the windings of alternate busy test relays BT0(10), BT2(10), BT4(10), etc. Terminals 900 to 909, inclusive, on terminal strip B are connected through relays BTC3(10) and BMC1(10) to the windings of alternate busy test relays BT1(10), BT3(10), etc., which are intermediate the busy test relays to which terminals 910 to 919 are connected. Terminals 900 to 909, inclusive, and 913 to 919, inclusive, are also connected to the hold magnets of the trunks of the group in which the search for an idle trunk is to be made. The terminals 910 to 912, inclusive, which are not connected to hold magnets of trunks, are strapped together and permanently grounded, and consequently the busy test relays BT0(10), BT2(10) and BT4(10) which are connected to those terminals will be operated whenever relays BTC3(10) and BMC1(10) are operated.

Let it be assumed that trunk 900 is busy, and that the first idle trunk is that connected to terminal 901 on terminal strip B. Since the busy condition of a trunk is evidenced by a ground upon its hold magnet (as indicated by the dotted connection to ground), terminal 900 will thereby be grounded and in consequence thereof busy test relay BT1(10) will be operated. Since trunk 901 is idle, its hold magnet will not be grounded, and accordingly, the busy test relay BT3(10), which is connected to terminal 901, will not be operated. Thereupon a circuit will be closed that extends from ground G17 and includes contact 32 of relay BTC3(10), contact 20 of relay BMC1(10), the chain of contacts 1 of relays BT0, BT1 and BT2, inclusive, the armature and contact 2 of relay BT3(10), the winding of the surge generator control relay SC3(10), and the grounded battery connected thereto. This effects the operation of relay SC3(10) and the closing of its contacts 1 to 3, inclusive. Through contact 2 of relay SC3(10) a circuit is established from ground G13 that includes contact 2 of relay SC3(10), contact 33 of relay BMC1(10), lead 1001, contact 3 of relay GTR(6), the winding of relay TE(6) and grounded battery B3(6). Relay TE(6) will thereupon be operated and by closing its ten contacts will effect the connection of the ten leads in cable 604 (that extend to the terminal strip shown on Fig. 5) to ten leads in cable 603 that extend to the closed contacts 22 to 31 and the armature of the busy test marker connecting relay BMC1(10). Each of the armatures 22 to 31, inclusive, is connected to the armatures of two successive relays of the surge generator connecting group SC0(10) and SC1(10), SC2(10) and SC3(10), etc., the purpose of which will presently be apparent.

Also, through the closing of contacts 1 and 3 of relay SC3(10) a circuit is established that may be traced from battery B25 of the surge generator, shown on Fig. 4, through contact 1 of relay SIG(4), leads 401 and 701, contact 21 of relay BMC1(10), contact 1 of relay SC3(10), contacts 3 of relays BMC2(10) and BTC4(10), terminal 901 of terminal strip C, the jumper J3 extending through coils C0, C3, C6, C10, C12, C15, C17, C19, C24 and C26 to terminal 901 upon the terminal strip shown on Fig. 5, lead 1 in cable 604(6) to contact 1 of relay TE(6), lead 1 in cable 603(6) to and through contact 23 of relay BMC1(10), contact 3 of relay SC3(10) to ground G8(10). The closing of that circuit will, in the manner heretofore described, cause the tube T30 of the generator to fire, which will operate relay SIG(4) and that, in turn, will send a surge of current through the jumper J3 and thereby induce a voltage in the coils through which the jumper is threaded. Accordingly, the tubes associated with those coils will be fired and will operate the translator relays connected to those tubes which in turn will control the work relays in the marker that serve to identify the location of the particular frame upon which is located the cross-bar switch and the hold magnet of trunk 901.

In the foregoing description of the functioning of the circuit, the number of the trunk assumed to be idle, namely 901, belonged to the tens even group. To fully illustrate the mode of functioning of the circuit, let it be assumed that all trunks which belong to the tens even group, are busy, and that the first idle trunk is one of the tens odd group, viz., 913. Upon the dialing by a subscriber of the first number of the entire group of trunks extending to a given P. B. X, namely 900, relays BTC3(10) and BTC4(10) will be operated; and as previously described, each terminal of the group 900 to 919 upon terminal strip B will be connected to one of the busy test relays BT0(10), BT1(10), etc. Since terminals 910, 911 and 912 are permanently grounded, relays BT0(10), BT2(10), BT4(10), will be operated. Likewise, relays BT1(10), BT3(10), BT5(10), will be operated since they are connected to terminals 900, 901, and 902, respectively, which are connected to busy trunks and consequently are grounded. Busy test relay BT6(10) will not be operated since it is connected to the idle trunk 913. Thereupon relay SC6(10) will be operated over a circuit that may be traced from grounded battery through the winding of relay SC6, contact 2 of relay BT6, contacts 1 of relays BT5 to BT0, inclusive, contact 20 of relay BMC1(10), contact 32 of relay BTC3(10) and ground G17. The operation of relay SC6 effects the operation of the tens odd relay TO(6), the operating circuit extending from ground G13(10) and including contact 2 of relay SC6(10), contact 34 of relay BMC1(10), lead 1000, contact 2 of relay GTR and winding of relay TO(6) to the grounded battery B3. Through the closing of contacts 1 and 3 of relay SC6, a circuit is closed that extends from battery B25 of the surge generator, shown in Fig. 4, and includes leads 401 to 701, contact 21 of relay BMC1(10), contact 1 of relay SC6(10), contacts 6 of relays BMC2(10) and BTC4(10), terminal 913 of terminal strip C, a jumper (not shown) that would extend from that terminal through a selected combination of coils of the group C0 to C26, inclusive, to terminal 913 upon the ground terminal strip shown on Fig. 5, thence through lead 3 in cable 600 to contact 3 of the tens odd relay TO, thence over lead 3 in cable 603 to contact 25 of relay BMC1(10), contact 3 of relay SC6 and ground G8. The closing of that circuit will, in the manner hereinbefore described, cause a surge of current to flow over the circuit and effect the firing of the tubes associated with the coils through which the jumper would be threaded. The firing of the tubes will in turn effect the operation of the translator relays and thereby enable the marker to identify the location of the hold magnet of trunk 913 upon a line-link frame.

It is important to note that when the numbers of the trunks extending to a given P. B. X fall in separate tens blocks, as, for example, 900 to 909, and 910 to 919, and the same units digits appear in both blocks, as for example 900 to 910, it is necessary to connect the leads extending from the armatures of a busy test connecting relay, such as BCT3, to the terminals upon a directory number terminal strip, such as B, in a predetermined sequence in order to ensure the grounding of the units terminal of the ground terminal strip (Fig. 5) upon the finding of the first idle trunk. Since the terminals on the ground terminal strip (Fig. 5) are divided into two groups, those having odd tens digits and those having even tens digits, the group of terminals in which the tens digit of the number of the idle trunk appears (that is, the odd tens or the even tens group) must first be selected and thereafter a ground must be applied to the units lead of the selected group that corresponds to the units digit of the idle trunk number. The selection of the proper group is effected by the operation of the tens odd or tens even relays, TO or TE, which takes place upon the operation of the SC relay corresponding to the idle trunk. Likewise, the grounding of the proper units lead is effected by the operation of the same SC relay. The armatures of the busy test connecting relay BTC3 should be connected to odd tens numbered terminals and even tens numbered terminals alternately, as for example, 910, 900, 911, 901, etc., and the arrangement should be such that the adjacent pairs of terminals upon terminal strip B should have the same units digits. Furthermore, each units lead from the ground terminal strip, Fig. 5, should be connected to two similarly disposed armatures of a pair of SC relays, such as the armatures 4 of SC0 and SC1, SC2 and SC3, etc., the contacts of which are connected to ground.

When the armatures of the busy test connecting relay BTC3 are connected to the terminals of the terminal strip B in the manner just described, and when that relay is operated, the windings of the busy test relays BT0, BT1, etc., will also be connected to those terminals, and all busy test relays that are connected to permanently grounded terminals or to busy trunks will be operated. The busy test relay connected to an idle trunk will not operate. Accordingly, the ground connection for the operation of the relays of the surge connector group, SC0, SC1, etc., will be extended over the armatures and contacts of the operated busy test relays BT0, BT1, etc., to the winding of the surge connector relay that is associated with the non-operated busy test relay connected to the first idle trunk and will effect the operation of that surge connector relay. By the closing of contact 2 of the operated surge connector relay the tens odd or tens even relay, TO or TE, will be operated (the choice depending upon whether the tens digit of the number of the idle trunk is odd or even) and that, in turn, will connect the ten units leads from the tens odd or from the tens even terminals of the ground terminal strip, Fig. 5, to the leads in cable 603 which are immediately connected to the armatures 4 of the surge connector relays SC0, SC1, etc. Of those ten leads so connected only one will be grounded, namely, that lead having the same units digit as that of the number of the idle trunk. It will therefore be apparent that even though two trunks in different tens blocks may have the same units digits, the proper terminal of the ground terminal strip, Fig. 5, will always be grounded by the surge connector relay, Fig. 10, namely, that corresponding to the number of the idle trunk, thereby ensuring the transmission of the surge of current through the proper jumper.

An important feature of the invention resides in the use of the terminal strip, shown in Fig. 5, in connection with the translating circuit which prevents faulty operation of the translator that otherwise might occur when a pair of adjacent terminals upon the directory number terminal strip E (Fig. 2) or C (Fig. 10) become crossed. In the type of strip shown in Fig. 5, all terminals of the even tens group 000, 020, 040, etc., are connected to one common conductor, and similarly, all terminals of the odd tens group 010, 030, etc., are connected to another conductor. As previously shown, one end of each jumper is connected to one of the terminals of the directory number terminal strip E of Fig. 2, or terminal strip C of Fig. 10, and, in order for the system to function, the other end of each jumper must be grounded when the surge generator is connected to the jumper so that current may be sent through the jumper. If the jumpers were permanently grounded and a cross occurred between adjacent terminals upon the directory number terminal strip C or E, a closed circuit would be created extending from ground upon one jumper, thence over that jumper to and through the crossed terminals of the directory number terminal strip, thence over the other jumper to ground. If, during the existence of the cross, a surge of current passes over a third jumper, which is threaded through some of the coils through which are threaded the jumpers upon which the cross has occurred, a voltage will be set up in the closed circuit created by the cross and the resultant flow of current thereover would effect the operation of those relays in the translator circuit through which the latter jumpers pass, and give a false indication. Such faulty operation of the translator is avoided by the use of a terminal strip of the type shown in Fig. 5 in connection with relays such as TE and TO shown in Fig. 6. If, for example, a surge of current is transmitted through the jumper connected to terminal 900, relay TE would be operated since the tens digit 0 is an even number. That would result in grounding the common conductor of the terminal strip to which all terminals having even tens digits are connected, but the common conductor to which the odd tens terminals are connected would not thereby be grounded. Assuming that terminals 914 and 909 upon the directory number terminal strip (Fig. 10) are crossed, the jumper connected to the even tens terminal 909 would be grounded through the contact of even tens relay TE(6). On the other hand, terminal 914, which belongs to the odd tens group would not be grounded because the odd tens relay TO(6) is not operated. Accordingly, since only one of those jumpers is connected to ground a closed circuit could not be formed. The only situation that would give rise to a closed circuit may occur when two terminals of the even tens group or two of the odd tens group became crossed upon the directory number terminal strip. Since, as indicated clearly in Fig. 5, the even tens rows of terminals and the odd tens rows of terminals upon the directory number terminal strip occupy alternate positions thereon, and are relatively widely separated, the probability of a cross occurring between two terminals of an even tens group or of an odd tens group is believed to be quite remote.

It is desired to point out that one of the advantages arising from the provision of busy test relays in the marker for the maximum number of P. B. X lines in a group extending to a particular P. B. X is that trunk hunting is simplified and the need for special arrangements for jump hunting is avoided.

While the invention has been described as embodied in a particular form and as applied to a particular telephone system, it is not to be understood or construed as being so limited since it may be embodied in other and different forms and may have other applications without departing from the spirit and scope of the appended claims.

What is claimed is:

1. In a telephone switching system, in combination, means to register signals representing the directory number of a called station, means to translate that number to an indication of the location of the terminals of the station having the said directory number, said translating means including an inductive translating device having a plurality of coils, each having a voltage responsive device connected therewith to give an indication of the location of terminals of said station having said directory number, a plurality of jumpers each inductively linked with a selected combination of said coils, said combinations being discrete, each jumper being identified with a particular station, a cross-bar switch responsive to signals representing the registration of the hundreds digit and the tens digit of said directory number to select a group of jumpers among which is the jumper which is identified with the called station, a source of voltage and means responsive to the registration of the units digit of said directory number to select one jumper of said selected group of jumpers and interconnecting means to connect said source to the selected jumper identified with the called station for actuating the voltage responsive devices connected to the inductive translating coils with which said selected jumper is linked whereby the location of the terminals of that station will be indicated.

2. In a telephone switching system, in combination, means to register signals representing the directory number of a called line, means to translate the said number to an indication of the location of the terminals of that line in said switching system, said translating means including an inductive translating device having a plurality of coils, each having a voltage responsive device connected therewith to give an indication of the location of the terminals of a called line, a plurality of jumpers each identified with one of the telephone lines, each jumper being threaded through a selected combination of said coils, the combinations being discrete, and means including a cross-bar switch responsive to signals representing the registration of the said directory number to selectively transmit a surge of current to the jumper identified with the called line for actuating the voltage responsive devices connected to the translating coils through which said jumper is threaded.

3. In a telephone switching system, in combination, means to register the directory number of a called station, a device to translate the directory number of the called station to an indication of the location of its terminals in said switching system, said device comprising a plurality of coils each having a winding thereon, a plurality of gaseous discharge devices, each connected to the winding of one of said coils, a plurality of relays each connected to one of said devices, a plurality of jumpers each identified with the directory number of a station, each jumper being inductively linked with those coils that will operate those relays that will indicate the location of the terminals of the station having the directory number with which the jumper is identified, a surge generator, a cross-bar switch, one of whose select magnets and hold magnets responds to signals identifying the hundreds digit and tens digit, respectively, of the directory number of the called station to close a plurality of contacts, a units relay responsive to signals identifying the units digit of the number of the called station to establish through one of the closed contacts of said cross-bar switch a closed circuit between said generator and that jumper which is identified with the directory number of the called station whereby a voltage will be set up in each coil with which said jumper is inductively linked to operate the relays connected thereto whereby the location of the terminals of the called line may be indicated.

4. In a telephone switching system, in combination, means to register signals representing the directory number of a called subscriber's line, a cross-bar switch the select magnet of which is responsive to signals representing the registration of the hundreds digit of the directory number and the hold magnet is responsive to signals representing the registration of the tens digit of that number to effect the closing of ten contacts of said switch, a units relay responsive to signals representing the registration of the units digit of the directory number, a terminal strip whose terminals are numbered according to directory numbers of the subscriber's lines, each of said terminals being connected through a closed contact of said switch to a contact of one of said units relays, a second terminal strip, a plurality of translator coils, a jumper connected to the same numbered terminal of each of said terminal strips, the said jumper being threaded through a selected combination of said coils, means under the control of said hold magnets to connect to ground the terminal of said second terminal strip to which the said jumper is connected, a surge generator, a surge control relay operable upon the operation of said units relay to connect said surge generator to that terminal of the first-mentioned terminal strip to which the said jumper is connected to effect the transmission of a surge of current through said coils, a plurality of gas filled tubes each so connected to a winding upon said coils as to be fired by the voltage induced therein by a surge of current from said generator and a plurality of relays, each individually so connected to one of said tubes as to be operated by the firing of said tube whereby a group of said relays is operated designating the location of the terminals of the called line in said switching system.

5. Apparatus for finding an idle trunk in a group of trunks which are terminated upon the same tens block in a telephone switching system and for translating the directory number of the idle trunk to a designation of the location of its terminals in said system, comprising, in combination, means to register signals representing the directory number of one of the trunks of said group, a translator comprising a plurality of coils, a plurality of jumpers each representing the directory number of one of said trunks, each jumper being inductively linked to a combination of said coils, the said combinations being discrete, a terminal strip having thereon a plurality of terminals numbered in accordance with the numbering of the said group of trunks, a cross-bar switch responsive to signals representing the registered directory number of the called line to select the terminal having the directory number of the called line and to ground the selected terminal, a relay whose winding is connected to all terminals whose numbers correspond to those of the trunks of said group of trunks and operable upon the grounding of any of said terminals, a trunk terminal strip to which the hold magnets of all trunks of the said group are connected, idle trunk finding apparatus responsive to the operation of said relay for finding an idle trunk of said group of trunks, a source of voltage and means responsive to the finding of an idle trunk in the said group of trunks terminated upon the trunk terminal strip to effectively connect the said source of voltage to the jumper having the same directory number as said idle trunk to induce a voltage in the coils with which said jumper is linked and means responsive to said voltage to indicate the location upon the line-link frame of the hold magnet of the idle trunk.

6. In combination in a communication switching system, a plurality of trunk circuits arranged in a group which are terminated upon the same tens block in a telephone switching system and for translating the directory number of that trunk to an indication of the location of its terminals in said switching system, comprising, in combination, means to register signals representing the directory number of the called line, a translator comprising a plurality of coils, a plurality of jumpers each corresponding numerically to one of said trunks, each jumper being inductively linked to a combination of said coils, the said combinations being discrete, a cross-bar switch responsive to signals representing the registered directory number of the called line to select the terminals of the tens block upon which the group of trunks terminate, trunk finding means, switching apparatus responsive to the selection of one of said terminals to initiate the operation of said trunk finding means, a surge generator, switching means responsive to the finding of the first idle trunk in said group of trunks to connect said surge generator to that jumper having the same directory number as the idle trunk whereby a surge of current may be transmitted over said jumper to set up a voltage in the coils with which said jumper is linked, and means responsive to said voltage to indicate the location in said switching system of the equipment terminals of the called line.

7. Apparatus for finding an idle trunk in a group of trunks in a telephone switching system and for translating the directory number of that trunk to an indication of the location of its terminals in said system comprising, in combination, means for registering signals representing the directory number of a called trunk in said group, a terminal strip whose terminals have the same identifying designations as the group of trunks, means to test each of said trunks to determine its busy condition, a cross-bar switch responsive to signals representing the registration of the directory number of a called line to establish a connection between the terminals of said terminal strip and said means for registering the called number, switching means operable upon the establishing of said connection by said cross-bar switch to connect the terminals of said trunks to the busy test means, a plurality of coils, a plurality of jumpers, each identified with one of said trunks and inductively linked with a selected combination of said coils, said combinations being discrete, and means controlled by the busy test means to apply a voltage to that jumper which is identified with an idle trunk of the said group of trunks to induce a voltage in each coil of the selected combination and location indication means responsive to said induced voltage.

8. Apparatus for finding an idle trunk in a group of trunks in a telephone switching system and for translating the directory number of that trunk to an indication of the location of its terminals in said system, comprising, in combination, means to register signals representing the directory number of one of the trunks of said group, a plurality of coils arranged in groups each of which is designed to furnish a detail of information as to the location of the terminals of an idle trunk, a plurality of jumpers each identified with one of said trunks and each threaded through a selected combination of coils, the several combinations being discrete, a terminal strip to terminate each trunk of said group, a source of voltage, a second terminal strip whose terminals correspond in numbering to that of the trunks connected to the first terminal strip, a plurality of busy test relays each actuatable to one or the other of their conditions by the busy condition of one of said trunks, a cross-bar switch operated by signals representing the registered directory number of the called line to ground one of the terminals of said second terminal strip, a relay whose winding is connected to all terminals and operable upon the grounding of any of said terminals to effect the connection of each terminal of the first-mentioned terminal strip to one of said busy test relays, and switching means responsive to a busy test relay controlled by an idle trunk to connect said source of voltage to that jumper which is identified with said idle trunk to thereby indicate the location of the terminals of said trunk in said switching system.

9. Apparatus for finding an idle trunk in a group of trunks that terminate upon different tens blocks in a telephone switching system and for translating the directory number of that trunk to an indication of the location of its terminals in said system, comprising, in combination, means for registering signals representing the directory number of a called trunk in said group, a terminal strip upon which the trunks of said group are terminated, a second terminal strip identified with the same group of trunks as the first-mentioned terminal strip, a plurality of busy test relays actuatable individually by the busy condition of the respective ones of said trunks, a plurality of surge generator control relays responsive to said busy test relays, a cross-bar switch responsive to signals representing the registration of the directory number of a called line to establish a connection between said second terminal strip and said means for registering the called number, switching means operable upon the establishing of said connection by said cross-bar switch to connect each terminal of said first-mentioned terminal strip to one of the busy test relays, a plurality of coils, a plurality of jumpers, each identified with one of said trunks, and inductively linked with selected combinations of said coils, said combinations being discrete, and means controlled by said busy test relays to apply a voltage to that jumper identified with an idle trunk of the group of trunks terminated upon said first-mentioned terminal strip to induce a voltage in each coil of the selected combination and location indication means responsive to said induced voltage.

10. In a telephone switching system, in combination, means to severally register signals representing the digits of the directory number of a called line, a translating device including a plurality of coils, a cross-bar switch having therein switching means responsive to signals representing the registration of the hundreds digit and the tens digit of said directory number to connect the units digit registering means to the cross-bar switch terminals, a plurality of units relays, each responsive to signals representing the units digit registering means, a plurality of jumpers each having the directory number of one of the subscriber's lines, each jumper being connected to a terminal of said cross-bar switch and being threaded through a selected combination of said coils, said combinations being discrete, a tens-even relay operable whenever the tens digit of the called number is an even digit to connect the jumper from an even-tens terminal on the cross-bar switch to said units relays, a tens-odd relay operable whenever the tens digit of the called number is an odd digit to connect the jumper from an odd-tens terminal on the cross-bar switch to said units relays, a surge generator and means controlled by an operated units relay to connect said generator to said jumper at a prefixed time after the operation of said units relay whereby a surge of current will be transmitted over said jumper and means responsive to the voltage induced in the coils with which the jumper is linked to indicate the location of the hold magnet of the called line.

11. In a telephone switching system, in combination, means to register signals representing the directory number of a called line, means to translate the said directory number to an indication of the location of the terminals of said line in said switching system, the said translating means comprising a plurality of coils, each having a winding thereon, a plurality of voltage responsive devices, each connected to a winding of one of said coils, and a plurality of relays each connected to one of said voltage responsive devices, a jumper, having the directory number of a line, threaded through a selected combination of said coils, a units relay operated upon the registration of the units digit of the called number, a cross-bar switch having a plurality of select magnets and hold magnets, one of the select magnets responding to signals representing the hundreds digit of the called line, and one of said hold magnets responding to signals representing the tens digit of the called line, to close a path between a contact upon said units relay and said jumper, a surge generator and means to connect the said generator to the said jumper at a prefixed time after the operation of said units relay whereby said tubes will be fired and their associated relays will be operated to indicate the location of the terminals of the called line in said switching system.

12. In a telephone switching system, in combination, a plurality of coils arranged in groups, each group representing a factor in the position indication of the terminals of a called subscriber's line, a plurality of jumpers each of which bears the same telephone directory number as one of said lines, each jumper being inductively linked to a selected combination of said coils, including at least one coil from each group, said selected combinations being discrete, a source of voltage, a cross-bar switch responsive to signals identifying a called directory number, said switch having a plurality of terminals to each of which one of said jumpers is connected, and also having a plurality of selecting magnets responsive to signals identifying the hundreds digit of the called number, and a plurality of holding magnets responsive to signals identifying the tens digit of said number whereby a plurality of units contacts of said switch will be closed, a plurality of units relays each responsive to signals identifying one of the units digits of said directory number, each unit relay being connected through one of said closed contacts to the terminals of said cross-bar switch and switching means operative at a prefixed interval after the operation of one of said units relays to connect said source of voltage to the jumper whose number corresponds to the directory number of the called line.

13. In a telephone switching system, in combination, means to register signals representing the directory number of a called party, a device to translate the said directory number to an indication of the position of the terminals of said line in said switching system, the device including a plurality of coils, a plurality of jumpers each having the directory number of a line and each being threaded through a selected combination of said coils, said combinations being discrete, a plurality of units relays each responsive to signals representing the registration of the units digit of the called number, a directory number terminal strip to which said jumpers are connected, a cross-bar switch responding to signals representing the hundreds digit and the tens digit of the called line to close a path between one of said units relays and the terminal upon said terminal strip to which is connected the jumper identified with the called line, a ground terminal strip to a terminal of which the selected jumper is also connected, said terminal strip having a group of conductors to each of which all terminals of the even tens group having the same units digits are connected and also having another group of conductors to each of which all terminals of the odd tens group having the same units digits are connected, means operative when the tens digit of the called number is even to connect the group of even tens conductors to the said units relays, means operative when the tens digit of the called number is odd to connect the group of odd tens conductors to the said units relays, a source of voltage, means to connect the said source to the said jumper at a prefixed time after the operation of said units relay whereby a voltage will be applied to the selected jumper, and means operated by the voltage induced in said coils to indicate the position of the terminals of said line in the telephone switching system.

14. Apparatus for translating the directory number of a called non-P. B. X line or P. B. X trunk to an indication of the location of the hold magnet of said line or trunk upon a line-link frame, comprising, in combination, means to register signals representing the directory number of the called party, a translator including a plurality of coils, a plurality of jumpers each linked with a combination of said coils, the combinations being discrete, certain of said jumpers being identified with non-P. B. X lines and the remainder identified with P. B. X trunks, a terminal strip upon which the non-P. B. X jumpers are terminated, another terminal strip upon which the P. B. X jumpers are terminated, the terminals of both terminal strips bearing the same directory numbers, switching means controlled by signals representing the called number including a cross-bar switch to find an idle trunk in a group of trunks containing the called number and to apply a voltage to the jumper identified with the idle trunk, a second switching means controlled by signals representing the called number including a cross-bar switch to select a terminal upon its terminal strip having the same number as the terminal to which the P. B. X jumper is connected, and means responsive to said first switching means to prevent interference therewith by the operation of said second switching means.

15. An apparatus for translating the directory number of a called non-P. B. X line or P. B. X trunk to an indication of the position of the hold magnet of said line or trunk upon a line-link frame, comprising, in combination, means to register signals identifying the directory number of the called party, cross-bar switches, directory number terminal strips, a translator including a plurality of coils, a plurality of jumpers threaded through selected combinations of said coils, the combinations being discrete, certain of said jumpers being identified with non-P. B. X lines and connected to one of said terminal strips, the remainder of said jumpers being identified with P. B. X trunks and connected to another terminal strip, selecting means controlled by one of said cross-bar switches when the called number is a P. B. X trunk to find an idle trunk in the group containing the called number and to transmit a surge of current over the jumper identified with the idle trunk.

16. Apparatus for translating the directory number of a called non-P. B. X line or P. B. X trunk to an indication of the location of the hold magnet of said line or trunk upon a line-link frame, comprising, in combination, cross-bar switches, terminal strips, a translator including a plurality of jumpers identified with P. B. X lines, a plurality of jumpers identified with non-P. B. X lines, a plurality of coils with certain combinations of which the jumpers are linked, the combinations being discrete, the P. B. X jumpers being connected to one terminal strip and the non-P. B. X jumpers to another terminal strip, means including said cross-bar switches to register signals representing the directory number of the called party and means responsive to signals representing said registration to effect the selection of the jumper identified with an idle P. B. X trunk or a non-P. B. X line, as the case may be, and to transmit over the selected jumper a surge of current.

17. In a telephone switching system, apparatus for translating the identifying designation of a called directory number to an indication of the location of the equipment terminals corresponding to that number comprising, in combination, means to register signals representing the called number, a translator including a plurality of jumpers, a plurality of coils with which said jumpers are inductively linked, said combinations being discrete, a plurality of terminal strips the terminals of which are similarly designated, certain of said jumpers being connected to terminals on one of said terminal strips, the remainder of said jumpers being connected to terminals on other of said terminal strips, no two jumpers being connected to terminals having the same designation, and means responsive to signals representing the registration of the called number to select the terminals upon both terminal strips having the called number, one of which has a jumper connected thereto, and to apply a voltage to both of said terminals.

18. In a telephone switching system, apparatus for translating an identifying designation of a called line into indications of the location of equipment terminals of said line, including in combination, means for registering signals identifying designations of a called line, a circuit conductor identified with the called line, a plurality of coils arranged in groups in which each group is individual to one of said indications, extending said conductor through a code group of coils in each of said groups of coils, a source of voltage, means including a cross-bar switch responsive to said registering means to connect said source to the conductor identified with the called line, means responsive to the voltage induced in said coils to indicate the location of the equipment terminals of the called line.

19. In a telephone switching system, apparatus for translating a multisymbol designation of a called telephone subscriber's station to indications representing the location of the equipment terminals of said called station including in combination means for registering signals identifying each of the symbols of a multisymbol called line designation, a group of coils individual to each of said indications, a circuit conductor inductively interlinked with a code group of the coils of each of said indications, a source of voltage, apparatus responsive to said registering means to connect said source to the conductor identified with the called line and means responsive to the voltage induced in said coils to indicate the location of the equipment terminals of the called line.

20. In a telephone switching system in combination, means to register signals representing the directory number of a called subscriber's station, means to translate said number into a plurality of indications designating the location of the terminals of said line of said switching system, translating means including a plurality of electromagnetic coils individual to each of said indications, a voltage responsive device individual to and individually connected to each of said coils, a relay controlled by said voltage responsive device, an electrical conductor identified with a called subscriber's station threaded through a selected combination of coils of each of said plurality of coils and apparatus responsive to signals representing the registration of said directory number to transmit a surge current over the conductor identified with the called line.

21. In a telephone switching system in combination, means to register signals identifying the directory number of a called subscriber's station, means to translate said number into a plurality of indications designating the location of the terminals of said line of said switching system, translating means including a plurality of electromagnetic coils individual to each of said indications, a voltage responsive device individual to and individually connected to each of said coils, a relay controlled by said voltage responsive device, an electrical conductor identified with a called subscriber's station threaded through a selected combination of coils of each of said plurality of coils, apparatus responsive to registration of said directory number to transmit a surge current over the conductor identified with the called line, and apparatus responsive to said surge for indicating the location of the equipment terminals of said line and establishing a connection to said terminals.

22. In combination in an automatic telephone switching system, a translating arrangement comprising a plurality of magnetic core structures arranged in groups, windings individual to each of said core structures, a plurality of selectable conductors, instrumentalities for transmitting signals representing a called subscriber's directory number, means for selecting one of said conductors under control of signals representing at least a portion of a called subscriber's directory number, said conductors being threaded through code combinations of coils of each of said groups and apparatus for applying an electrical condition to the selected conductor for inducing voltages in the individual windings of the core structures through which said conductor is threaded, and circuit controlling elements responsive to code groups of voltages induced in the windings of the coils of each of said groups of core structures.

References Cited in the file of this patent

UNITED STATES PATENTS

| Number | Name | Date |
|---|---|---|
| 2,351,551 | Seibel | June 13, 1944 |
| 2,490,441 | Joel | Dec. 6, 1949 |
| 2,510,061 | Branson | Jan. 6, 1950 |